United States Patent
Kobara et al.

(10) Patent No.: US 6,549,662 B1
(45) Date of Patent: *Apr. 15, 2003

(54) METHOD OF RECOGNIZING CHARACTERS

(75) Inventors: Katsutoshi Kobara, Kawasaki (JP); Shinichi Eguchi, Kawasaki (JP); Yoshihiro Nagano, Kawasaki (JP); Hideki Matsuno, Kawasaki (JP); Koichi Chiba, Kawasaki (JP); Yutaka Katsumata, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,356

(22) Filed: May 27, 1998

(30) Foreign Application Priority Data

Dec. 1, 1997 (JP) .............................................. 9-330182

(51) Int. Cl.[7] ................................................. G06K 9/34
(52) U.S. Cl. ........................ 382/229; 382/176; 382/190; 382/292; 345/469
(58) Field of Search ................................ 382/173, 181, 382/185, 187, 190, 218, 229, 309, 224, 317, 176; 345/469; 34/3.4

(56) References Cited

U.S. PATENT DOCUMENTS

| | | | | |
|---|---|---|---|---|
| 5,136,520 A | * | 8/1992 | Cox | 700/133 |
| 5,179,650 A | * | 1/1993 | Fukui et al. | 707/520 |
| 5,428,720 A | * | 6/1995 | Adams, Jr. | 345/604 |
| 5,504,822 A | * | 4/1996 | Holt | 382/218 |
| 5,563,957 A | * | 10/1996 | Ueno et al. | 382/173 |
| 5,673,337 A | * | 9/1997 | Gallo et al. | 382/187 |
| 5,768,451 A | * | 6/1998 | Hisamitsu et al. | 382/309 |
| 5,907,631 A | * | 5/1999 | Saitoh | 382/176 |
| 5,982,387 A | * | 11/1999 | Hellmann | 345/469 |
| 6,201,894 B1 | * | 3/2001 | Saito | 382/176 |
| 6,208,744 B1 | * | 3/2001 | Ishinge et al. | 382/100 |
| 6,438,566 B1 | * | 8/2002 | Okuno et al. | 707/512 |

\* cited by examiner

*Primary Examiner*—Bhavesh Mehta
*Assistant Examiner*—Gregory M Desire
(74) *Attorney, Agent, or Firm*—Arent Fox Kintner Plotkin & Kahn PLLC

(57) ABSTRACT

Characters of data on a document are recognized by automatically determining the definitions of characters of the data from the arrangement of character strings of the data. Character strings on the document are extracted by reading the document, and headers and data on the document are distinguished from each other by determining the positional relationship between the character strings. Character attributes of the data are determined by recognizing characters of the character strings of the headers using a header recognition dictionary. Characters of the character strings of the data are recognized according to the determined character attributes of the data. Since character attributes of the data are determined from recognized characters of the headers after the headers and the data are distinguished from each other from the layout on the document, it is possible to enter automatically the character attributes of the data.

13 Claims, 32 Drawing Sheets

| Block No. | Start coordinate | End coordinate | The number of character strings | The number of logical rows | The number of logical column | Address of leading logical row | Address of leading ligical column | Attribute |
|---|---|---|---|---|---|---|---|---|
| 1 | X,Y | X,Y | 1 | 1 | 1 | Address of logical row 2 | Address of logical column 1 | |
| 2 | X,Y | X,Y | 3 | 1 | 3 | Address of logical row 2 | Address of logical column 2 | |
| 3 | X,Y | X,Y | 5 | 1 | 5 | Address of logical row 3 | Address of logical column 3 | Header = 1 |
| 4 | X,Y | X,Y | 18 | 3 | 6 | Address of logical row 4 | Address of logical column 4 | Body = 2 |
| 5 | X,Y | X,Y | 2 | 1 | 2 | Address of logical row 5 | Address of logical column 5 | Footer = 3 |

| | | | | | 振込金額 | |
|---|---|---|---|---|---|---|
| (振込依頼書) | | | | | | |
| ((株)あいうえおシステム) | | | | | | |
| | | | | 振込指定日 平成9年7月20日 | | |
| (振込先) | | 科目 | 口座番号 | 受取人名 | | |
| いろは銀行 | 本店 | 普通 | 1234567 | あいうえお(株) | 1,000,000 | |
| にほへ銀行 | 本通り支店 | 普通 | 9876543 | かきくけこ(有) | 100,000 | |
| とちり信用金庫 | 本店 | 当座 | 9876543 | さしすせそたちつてと(株) | 22,312,000 | |
| | | | | (振込合計) | 23,412,000 | |

Character string table

| Data No. | Start | End | Nest information | Address of logical row link destination | Address of logical column link destination |
|---|---|---|---|---|---|
| 1 | X, Y | X, Y | | | |
| 2 | X, Y | X, Y | | Address of character string 3 | |
| 3 | X, Y | X, Y | | Address of character string 4 | |
| ⋮ | ⋮ | ⋮ | ⋮ | ⋮ | ⋮ |
| 28 | X, Y | X, Y | | Address of character string 29 | |
| 29 | X, Y | X, Y | | | |

T1

Logical row table

| Row No. | Start | End | The number of column | Address of leading character string |
|---|---|---|---|---|
| 1 | X, Y | X, Y | 1 | Address of character string 1 |
| 2 | X, Y | X, Y | 3 | Address of character string 2 |
| ⋮ | ⋮ | ⋮ | ⋮ | ⋮ |
| 7 | X, Y | X, Y | 2 | Address of character string 28 |

| | | | | | 振込指定日 平成9年7月20日 | |
|---|---|---|---|---|---|---|
| 振込先 | | 科目 | 口座番号 | 受取人名 | | 振込金額 |
| いろは銀行 | 本店 | 普通 | 1234567 | あいうえお(株) | | 1,000,000 |
| にほへ銀行 | 本通り支店 | 普通 | 9876543 | かきくけこ(有) | | 100,000 |
| とちり信用金庫 | 本店 | 当座 | 9876543 | さしすせそたちつてと(株) | | 22,312,000 |
| | | | | 振込合計 | | 23,412,000 |

- B1
- B2
- B3
- B4
- B5 (L4, L5, L6)
- B5

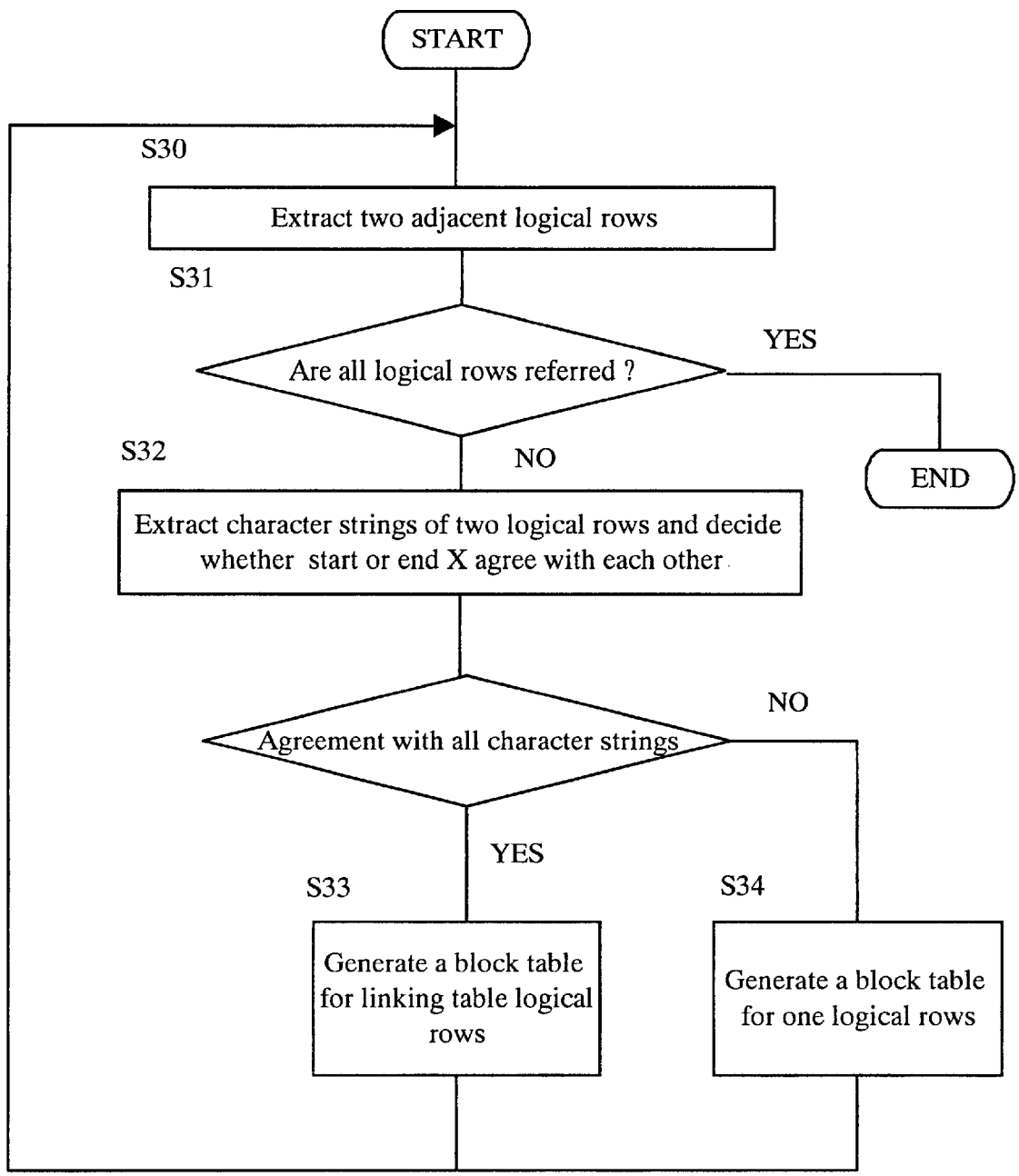

FIG. 13

| Block No. | Start coordinate | End coordinate | The number of character strings | The number of logical rows | The number of logical column | Address of leading logical row | Address of leading ligical column | Attribute |
|---|---|---|---|---|---|---|---|---|
| 1 | X,Y | X,Y | 1 | 1 | 1 | Address of logical row 2 | Address of logical column 1 | |
| 2 | X,Y | X,Y | 3 | 1 | 3 | Address of logical row 2 | Address of logical column 2 | |
| 3 | X,Y | X,Y | 5 | 1 | 5 | Address of logical row 3 | Address of logical column 3 | Header = 1 |
| 4 | X,Y | X,Y | 18 | 3 | 6 | Address of logical row 4 | Address of logical column 4 | Body = 2 |
| 5 | X,Y | X,Y | 2 | 1 | 2 | Address of logical row 5 | Address of logical column 5 | Footer = 3 |

Logical column table

T4

| Logical No. | Column start | End | The character string number | Address of the leading character string |
|---|---|---|---|---|
| 1 | X,Y | X,Y | 1 | Address of character string 1 |
| 2 | X,Y | X,Y | 1 | Address of character string 2 |
| 3 | X,Y | X,Y | 1 | Address of character string 3 |
| ⁓ | ⁓ | ⁓ | ⁓ | ⁓ |
| 5 | X,Y | X,Y | 1 | Address of character string 5 |
| 6 | X,Y | X,Y | 1 | Address of character string 6 |
| ⁓ | ⁓ | ⁓ | ⁓ | ⁓ |
| 10 | X,Y | X,Y | 3 | Address of character string 10 |
| 11 | X,Y | X,Y | 3 | Address of character string 11 |
| ⁓ | ⁓ | ⁓ | ⁓ | ⁓ |
| 16 | X,Y | X,Y | 1 | Address of character string 28 |
| 17 | X,Y | X,Y | 1 | Address of character string 29 |

FIG. 18

Character string table

| Data No. | Start | End | Nest data | Address of logical row link destination | Address of logical column link destination |
|---|---|---|---|---|---|
| 1 | X, Y | X, Y | | | |
| 2 | X, Y | X, Y | | Address of character string 3 | |
| 3 | X, Y | X, Y | | Address of character string 4 | |
| 5 | X, Y | X, Y | | Address of character string 6 | |
| 6 | X, Y | X, Y | | Address of character string 7 | |
| 10 | X, Y | X, Y | | Address of character string 11 | Address of character string 16 |
| 11 | X, Y | X, Y | | Address of character string 12 | Address of character string 17 |
| 28 | X, Y | X, Y | | Address of character string 29 | |
| 29 | X, Y | X, Y | | | |

Character string table

| Data No. | Start | End | Nest data | | Address of logical row link destination | Address of logical column link destination |
|---|---|---|---|---|---|---|
| 1 | X, Y | X, Y | | | | |
| 2 | X, Y | X, Y | | | Address of character string 3 | |
| 3 | X, Y | X, Y | | | Address of character string 4 | |
| 5 | X, Y | X, Y | | | Address of character string 6 | Address of character string 10 |
| 6 | X, Y | X, Y | | | Address of character string 7 | Address of character string 12 |
| 10 | X, Y | X, Y | ON | 1 | Address of character string 11 | Address of character string 11 |
| 11 | X, Y | X, Y | ON | 2 | Address of character string 12 | Address of character string 16 |
| 28 | X, Y | X, Y | | | Address of character string 29 | |
| 29 | X, Y | X, Y | | | | |

Logical column table    T4

| Column No. | Start | End | The character string number | Address of leading character srings |
|---|---|---|---|---|
| 1 | X,Y | X,Y | 1 | Address of character string 1 |
| 2 | X,Y | X,Y | 1 | Address of character string 2 |
| 3 | X,Y | X,Y | 1 | Address of character string 3 |
| 5 | X,Y | X,Y | 7 | Address of character string 5 |
| 6 | X,Y | X,Y | 4 | Address of character string 6 |
| 10 | X,Y | X,Y | 0 | Address of character string 10 |
| 11 | X,Y | X,Y | 0 | Address of character string 11 |
| 16 | X,Y | X,Y | 1 | Address of character string 28 |
| 17 | X,Y | X,Y | 1 | Address of character string 29 |

Group table

| Group No. | Start | End | The number of block | Leading block address |
|---|---|---|---|---|
| 1 | X,Y | X,Y | 1 | Address of block 1 |
| 2 | X,Y | X,Y | 1 | Address of block 2 |
| 3 | X,Y | X,Y | 3 | Address of block 3 |

Character string table

| Data No. | Start | End | Nest data | Header flag | Address of logical row link destination | Address of logical column link destination |
|---|---|---|---|---|---|---|
| 1 | X,Y | X,Y | | | 1 | |
| 2 | X,Y | X,Y | | | 1 | Address of character string 3 | |
| 3 | X,Y | X,Y | | | 1 | Address of character string 4 | |
| ⋮ | ⋮ | ⋮ | ⋮ | ⋮ | ⋮ | ⋮ |
| 5 | X,Y | X,Y | | | 1 | Address of character string 6 | Address of character string 10 |
| 6 | X,Y | X,Y | | | 1 | Address of character string 7 | Address of character string 12 |
| ⋮ | ⋮ | ⋮ | ⋮ | ⋮ | ⋮ | ⋮ |
| 10 | X,Y | X,Y | ON | 1 | 0 | Address of character string 11 | Address of character string 11 |
| 11 | X,Y | X,Y | ON | 2 | 0 | Address of character string 12 | Address of character string 16 |
| ⋮ | ⋮ | ⋮ | ⋮ | ⋮ | ⋮ | ⋮ |
| 28 | X,Y | X,Y | | | 1 | | |
| 29 | X,Y | X,Y | | | 0 | Address of character string 29 | |

| Header identification code | Image data |
|---|---|
| Transfer definition | |
| Item | |
| ⋮ | ⋮ |

50-1

50-2

| Header identification code | Category of character recognition | Font |
|---|---|---|
| Transfer destination | Kanji | Type face |
| Item | Kanji | Type face |
| | | |

FIG.29

| Character string No. | Start | End | Nest | data | Header flag | Function name | Category | Font | Address of logical row link destination | Address of logical column link destination |
|---|---|---|---|---|---|---|---|---|---|---|
| 1 | X1, Y1 | X2, Y2 | | | 1 | | | | | |
| 2 | X3, Y3 | X4, Y4 | | | 0 | Transfer request | Kanji | Type | Character string 3 | |
| 3 | X5, Y5 | X6, Y6 | | | 1 | | | | Character string 4 | |
| ~ | ~ | ~ | ~ | ~ | ~ | | ~ | ~ | ~ | ~ |
| 5 | Xa, Ya | Xb, Yb | | | 1 | | | | Character string 6 | Character string 10 |
| 6 | Xc, Yc | Xd, Yd | | | 1 | | | | Character string 7 | Character string 12 |
| ~ | ~ | ~ | ~ | ~ | ~ | | ~ | ~ | ~ | ~ |
| 10 | Xe, Ye | Xf, Yf | ON | 1 | 0 | Transfer destination | Kanji | Type | Character strings 11 | Character string 11 |
| 11 | Xg, Yg | Xh, Yh | ON | 2 | 0 | Transfer destination | Kanji | Type | Character strings 12 | Character string 16 |
| | ~ | ~ | ~ | ~ | ~ | | ~ | ~ | | |
| 28 | Xi, Yi | Xj, Yj | | | 1 | | | | Character string 29 | |
| 29 | Xk, Yk | Xl, Yl | | | 0 | Transfer amount | Numeric | Hand written | | |

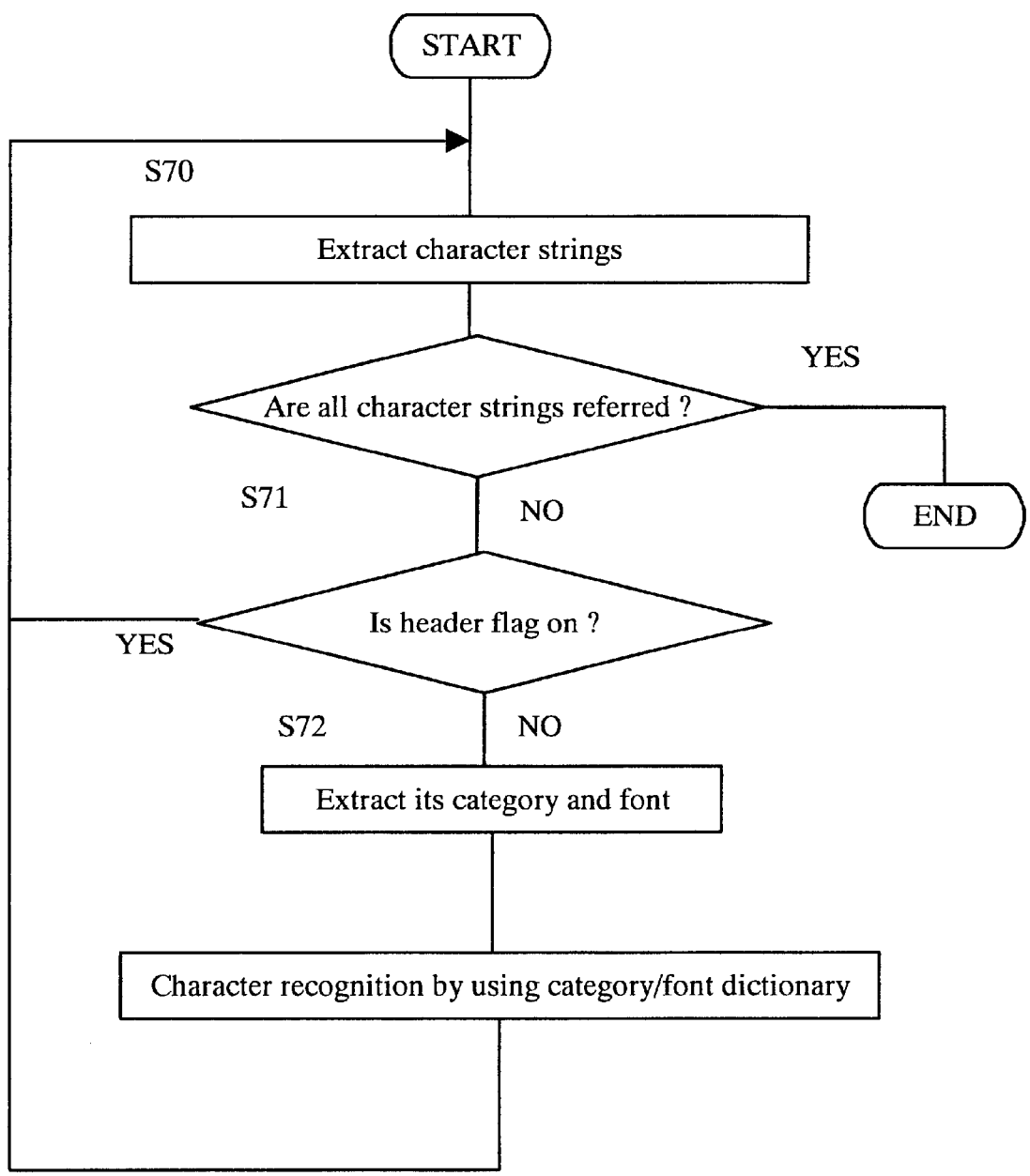

FIG. 32
PRIOR ART

| Position | Data name | Category | Font |
|----------|-----------|----------|------|
| C 10 | Transfer destination | Kanji | Type |
| C 11 | Transfer destination | Kanji | Type |
| | | | |

METHOD OF RECOGNIZING CHARACTERS

BACKGROUND OF THE INVENTION

1. Field of the Invention

The present invention relates to a method of recognizing characters of a character string contained in data by detecting the layout of the character string on a document.

2. Description of the Related Art

Characters on documents have various kinds including Kanji characters, numerical characters, and alphabetical characters, and are available in different fonts including type and handwritten characters. In order to recognize these characters accurately, it is necessary to define the positions, kinds, and fonts of characters.

FIG. 31 of the accompanying drawings illustrates a document, and FIG. 32 of the accompanying drawings illustrates a conventional method of recognizing characters.

In FIG. 31, a money transfer request slip is shown as a document. The illustrated money transfer request slip is written by Kanji characters and numeric characters as shown in FIG. 31. The illustrated money transfer request slip has 29 character strings C1–C29. The transfer requester is "AIU system" as indicated by the character string C2. The designated date of transfer is "September 20, Heisei 7" as indicated by the character strings C3, C4.

Headers include a transfer destination (C5), an item (C6), an account number (C7), a receiver (C8), and a sum of money to be transferred (C9). Data corresponding to the header of the transfer destination include the character strings C10, C11, C16, c17, C22, C23. Data corresponding to the header of the item include the character strings C12, C18, C24. Data corresponding to the header of the account number include the character strings C13, C19, C25.

Data corresponding to the header of the receiver include the character strings C14, C20, C26. Data corresponding to the header of the sum of money to be transferred include the character strings C15, C21, C27. The money transfer request slip also has a header "total to be transferred" (C28) and its data (C29).

For recognizing the characters of the data on the money transfer request slip, it is necessary to define the positions and names of the data. If the kinds of the characters of the data are known, then it is possible to limit the range where the characters of the data are recognized, for character recognition of higher accuracy. To limit the range of character recognition, it is necessary to define a character category of the characters of the data and the king of the character font.

As shown in FIG. 32, the position, data name (transfer destination), the character category (Kanji), and the character font (type) are defined with respect to the character string C10, for example. Heretofore, it has been customary to generate, in advance, definition information which defines positions where characters are to be read, for each document, register the definition information in a recognition apparatus, read an image on a document according to the registered definition information, and recognize characters from the image.

Since definition information needs to be registered beforehand, however, characters can be recognized only for those documents with respect to which the definition information has been registered in advance. Banking organizations use various formats for money transfer request slips that are generated by corporations for automatically making money transfers. It is tedious and time-consuming to generate definition information for those documents in advance.

Even if definition information for documents is registered, the registered definition information should be changed when a document format is changed.

SUMMARY OF THE INVENTION

It is an object of the present invention to provide a method of recognizing characters without the need for generation, in advance, of definition information of characters on documents.

Another object of the present invention is to provide a method of recognizing characters by automatically detecting the layout of characters on a document from an arrangement of character strings on a document.

Still another object of the present invention is to provide a method of recognizing characters by automatically detecting definition information of characters on a document to recognize characters of data thereon.

According the present invention, a method of recognizing characters of headers and characters of data on a document, comprises the steps of extracting character strings on the document by reading the document, distinguishing between headers and data on the document by determining the positional relationship between the character strings, determining character attributes of the data by recognizing characters of the character strings of the headers using a header recognition dictionary, and recognizing characters of the character strings of the data according to the determined character attributes of the data.

In the method, headers are determined from the positional relationship between character strings, and using the header recognition dictionary which has been registered in advance, the headers are recognized, and character attributes of the data are determined. Finally, character strings of the data are recognized according to the character attributes.

Because headers and data on documents are automatically distinguished from each other to recognize header characters, character attributes of the data can automatically be determined. Since headers are universal in nature and characters used therefor are limited, the header characters can easily be recognized. Furthermore, inasmuch as characters of data are recognized depending on the character attribute that has been determined, the characters of data are recognized with increased accuracy.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 4 is a view of a document, illustrating a logical row extracting process in the processing sequence shown in FIG. 2;

FIG. 9 is a diagram showing tables used in the character string extracting process shown in FIG. 3 and the logical row extracting process shown in FIG. 4;

FIG. 10 is a view of a document, illustrating a table structural part extracting process in the processing sequence shown in FIG. 2;

FIG. 12 is a flowchart of the table structural part extracting process shown in FIG. 10;

FIG. 13 is a diagram showing a block table used in the table structural part extracting process shown in FIG. 12;

FIG. 17 is a diagram showing a logical column table used in the logical column extracting process shown in FIG. 16;

FIG. 18 is a diagram showing a character string table used in the logical column extracting process shown in FIG. 16;

FIG. 21 is a diagram showing an updated character string table used in the block combining process shown in FIG. 19;

FIG. 22 is a diagram showing a logical column table used in the block combining process shown in FIG. 19;

FIG. 26 is a diagram showing a character string table used in the header extracting process shown in FIG. 25;

FIG. 28 is a diagram illustrating a header recognition dictionary used in the header recognizing process shown in FIG. 27;

FIG. 29 is a diagram illustrating the header recognizing process shown in FIG. 27;

FIG. 30 is a flowchart of a data recognizing process in the processing sequence shown in FIG. 2;

FIG. 32 is a diagram illustrating the conventional method of recognizing characters.

DETAILED DESCRIPTION OF THE PREFERRED EMBODIMENTS

Figure 1:
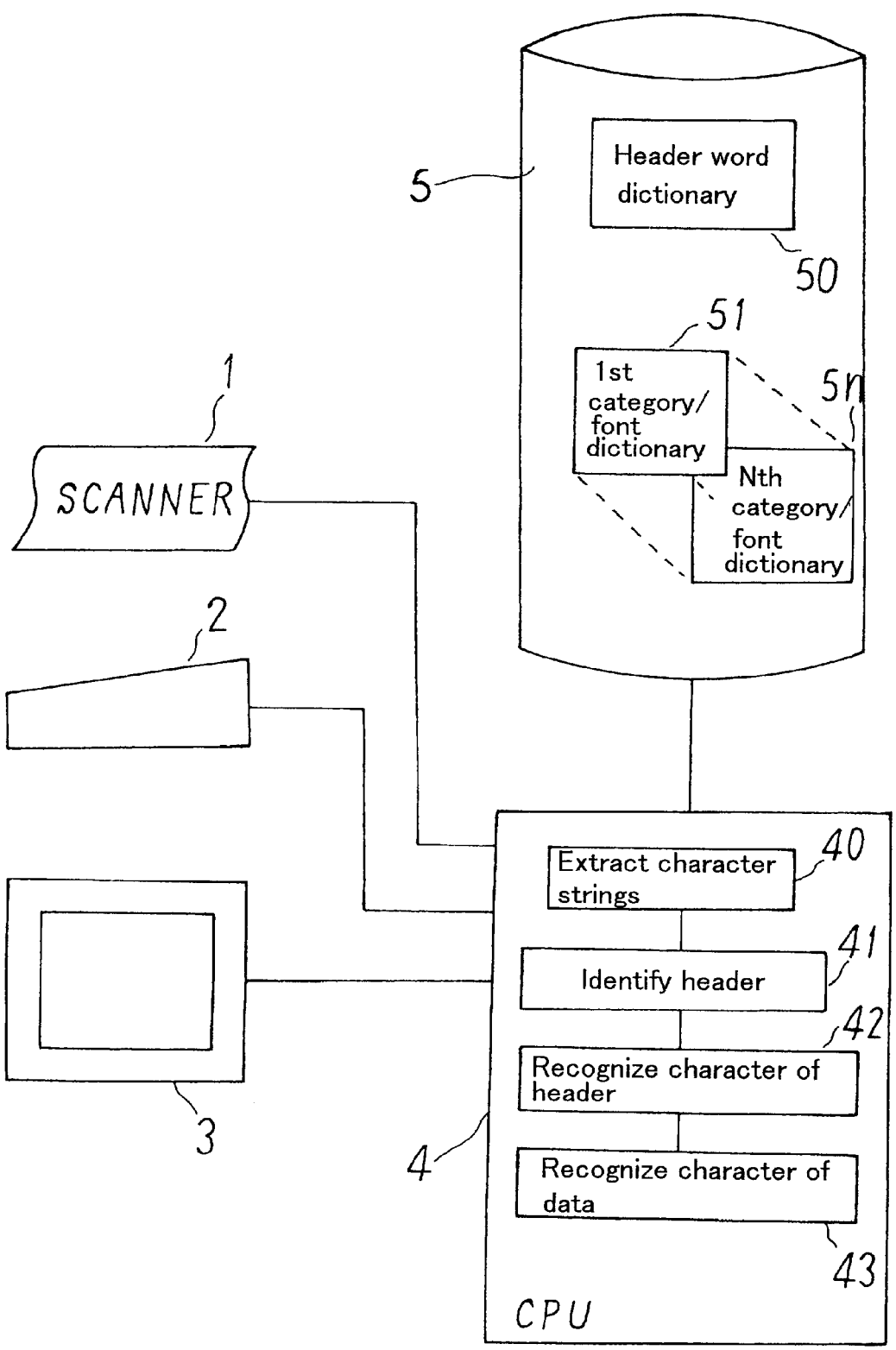
FIG. 1 is a block diagram of a character recognition system for carrying out a method of recognizing characters according to the present invention.

As shown in FIG. 1, a character recognition system has a scanner 1 for optically reading a document, a keyboard 2 operable by the operator for entering various input data, a display unit 3 for displaying results of character recognition, a processor (CPU) 4 for effecting a character recognition process, and a storage unit 5 for storing data required for the CPU 4 to effect the character recognition process.

The storage unit 5 stores a header word dictionary 50 and category/font dictionaries 5l–5n. The header word dictionary 50 contains predetermined header words and their image data. The category/font dictionaries 5l–5n comprises of character recognition dictionaries for each category and font. Each dictionary contains character code and its character image for recognition characters of data.

The CPU 4 comprises a character string extractor unit 40 for extracting character strings, a header identifier unit 41 for identifying a header from a character string, a header recognizer 42 for recognizing characters of a header, and a data recognizer 43 for recognizing characters of data. These components of the CPU 4 are functions that are performed by the CPU 4.

Figure 2:
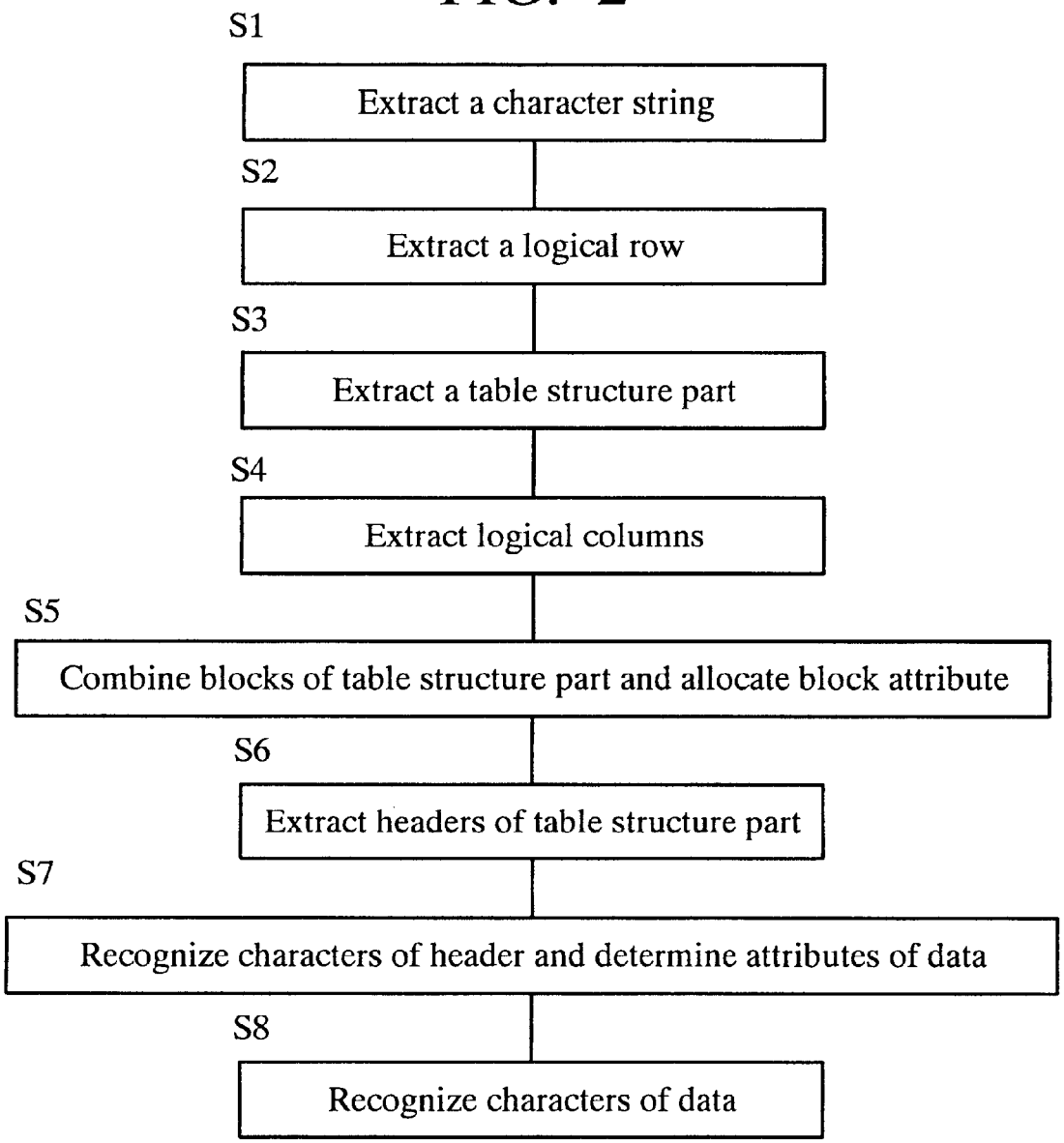
FIG. 2 is a flowchart of an overall processing sequence of the character recognition system shown in FIG. 1.

A character recognition process which is carried out by the character recognition system will be described below with reference to FIG. 2. In FIG. 2, numbers with a prefix "S" represent steps of the character recognition process.

(S1) The CPU 4 extracts a character string from image data of a document.

(S2) The CPU 4 extracts character strings in the same row from the extracted character string, thus extracting a logical row.

(S3) The CPU 4 extracts logical rows having the same row structure, thus extracting a table structural part.

(S4) The CPU 4 extracts logical columns having the same column structure.

(S5) The CPU 4 combines blocks of the table structural part, establishes a link between the logical columns, and allocates block attributes to the blocks according to predetermined rules.

(S6) The CPU 4 extracts headers from the block attributes.

(S7) The CPU 4 recognizes characters of the headers using the header dictionary 50, and determines attributes (data names, positions, character categories, and character fonts) of the characters of data.

(S8) The CPU 4 selects the category/font dictionaries 5l–5n according to the attributes of the data, and recognizes the characters of the data.

The processes in the above steps will be described below with reference to FIGS. 3 through 29. The money transfer request slip shown in FIG. 31 will be used as an example of a document.

Figure 3:
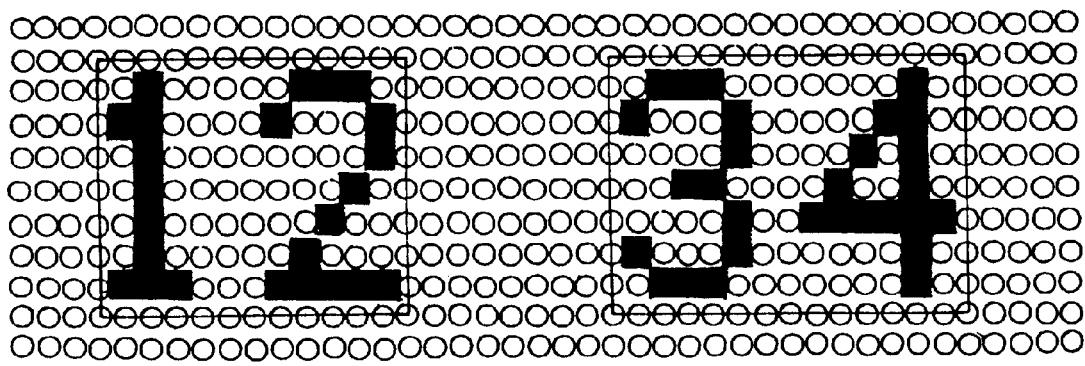
FIG. 3 is a diagram illustrating a character string extracting process in the processing sequence shown in FIG. 2.

A character string extracting process for extracting a character string in the step Si will be described below with reference to FIGS. 3 and 9. As shown in FIG. 3, image data of the document is scanned to extract labels representing successive black pixels. In FIG. 3, characters "1", "2", "3", and "4" are extracted as four labels. Of the extracted labels, those labels that are spaced by a distance smaller than a threshold value are extracted as labels belonging to the same character string. In FIG. 3, the character "1" and the character "2" belong to one character string, and the character "3" and the character "4" belong to another character string.

Areas surrounded by rectangular frames are extracted as character strings.

The extracted character strings are registered in a character string table T1 shown in FIG. 9. The character string table T1 comprises character string data numbers, character string start coordinates (X, Y), character string end coordinates (X, Y), nest information, logical row link destination addresses, and logical column link destination addresses.

Figure 31:
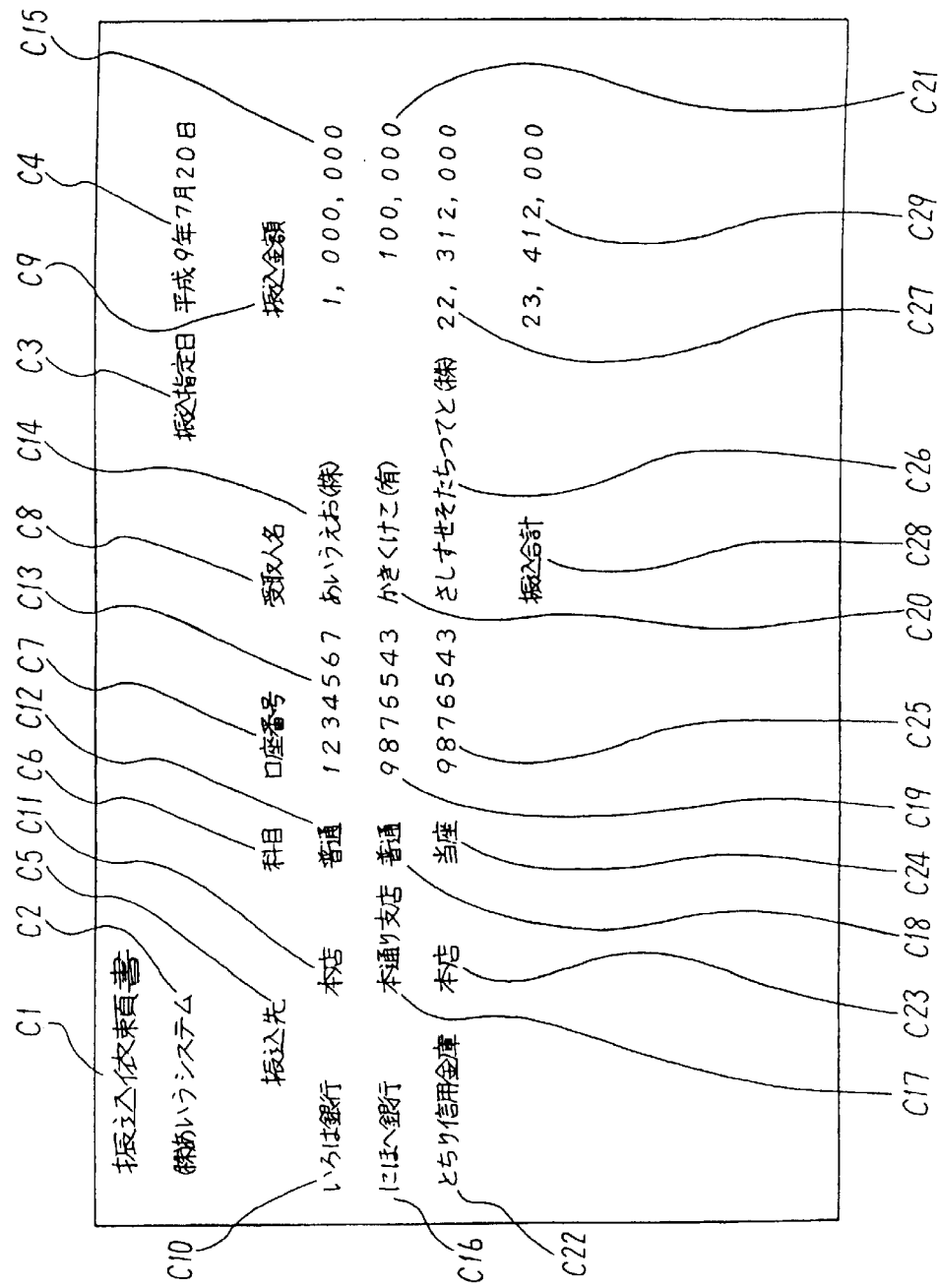
FIG. 31 is a view of a document, illustrating a conventional method of recognizing characters.

In the example shown in FIG. 31, 29 character strings are extracted, and the data numbers, start coordinates, and end coordinates of the extracted character strings are registered in the character string table T1.

A logical row extracting process for extracting a logical row in step S2 will be described below with reference to FIGS. 4 through 9.

Figure 5:
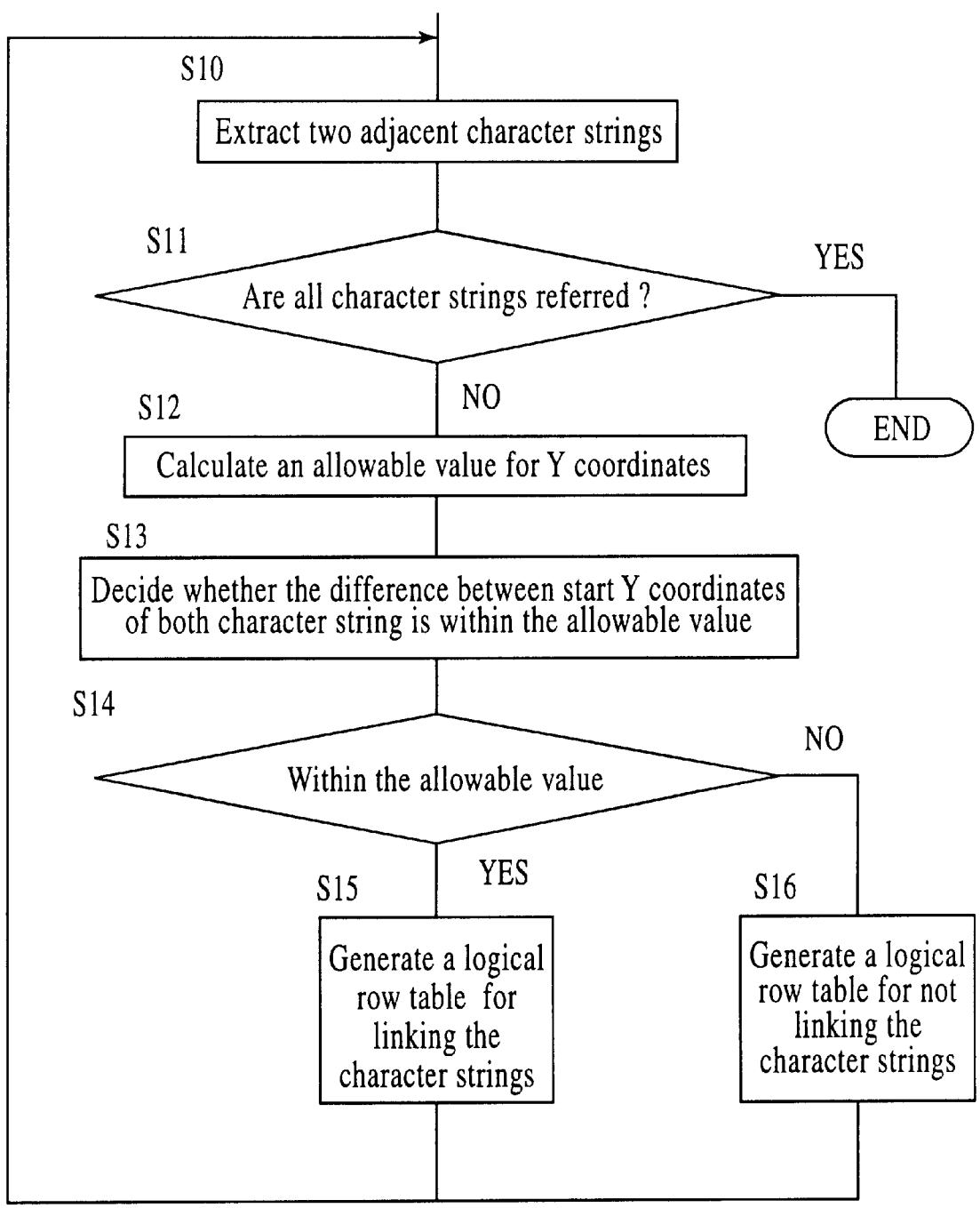
FIG. 5 is a flowchart of the logical row extracting process shown in FIG. 4.

The logical row extracting process is a process for determining the positional relationship between character strings and extracting item data (character strings) arranged horizontally (in the direction of rows) as a group constituting a logical row. In the example shown in FIG. 31, seven logical rows L1–L7 shown in FIG. 4 are extracted. The logical row extracting process will be described below with reference to FIGS. 5, 6, and 9. In FIG. 5, numbers with a prefix "S" represent steps of the logical row extracting process.

(S10) The CPU 4 extracts two adjacent character strings from the character string table T1 shown in FIG. 9.

(S11) The CPU 4 decides whether all character strings in the character string table T1 have been referred to. If all character strings in the character string table T1 have been referred to, then control comes to an end.

(S12) If not all character strings in the character string table T1 have been referred to, then the CPU 4 calculates an allowable value YA for Y coordinates. The CPU 4 calculates an allowable value YA on the assumption that the document is read obliquely.

(S13) The CPU 4 then calculates the difference Y between start Y coordinates of two character strings that are compared, and decides whether the difference Y is smaller than the allowable value YA or not.

(S14) If the difference Y is smaller than the allowable value YA, then control goes to step S15. If the difference Y exceeds the allowable value YA, then control goes to step S16.

Figure 6:
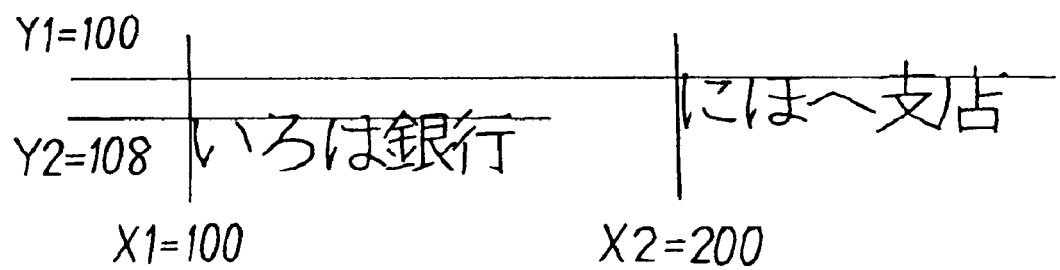
FIG. 6 is a diagram illustrating the logical row extracting process shown in FIG. 5.

In FIG. 6, even though two character strings are juxtaposed horizontally, they are inclined because the document itself is inclined. In view of the inlined orientation, it is decided whether the character strings are juxtaposed horizontally or not.

If the maximum angle θ of inclination is 5° in FIG. 6, then tan θ=0.087, and the range (allowable value) YA for Y coordinates in which character strings can have the same Y coordinates within the maximum angle θ of inclination is calculated by:

$$YA = X \times 0.087$$

where X is the difference between start X coordinates of the character strings.

Since X is equal to X2−X1=100 in the example shown in FIG. 6, the allowable range YA is 8.7. Therefore, two character strings having start X coordinates of X1, X2 are judged as being character strings which belong to the same logical row if the difference Y between the Y coordinates is equal to or smaller than 8 dots. If the difference Y between the Y coordinates is greater than 8 dots, then the two character strings are judged as being character strings which do not belong to the same logical row.

(S15) If two character strings are determined as belonging to the same logical row, then a logical row table for linking the character strings is generated. As shown in FIG. 9, a logical row table T2 comprises logical row numbers, character string start coordinates (X, Y), character string end coordinates (X, Y), character string numbers, and leading character string addresses.

In the example shown in FIGS. 31 and 4, for a logical row L2, start and end coordinates of the character strings C2, C4, a character string number "3", and the address of the character string C2 as a leading character string address are established. In the character string table T1, the address of the character string C3 is established as the address of the logical row link destination of the character string 2.

For a logical row L7, start and end coordinates of the character strings C28, C29, a character string number "2", and the address of the character string C28 as a leading character string address are established.

Control then returns to step S10.

(S16) If two character strings are determined as not belonging to the same logical row, then a logical row table for not linking the character strings is generated. As shown in FIG. 9, for a logical row L1, start and end coordinates of the character string C1, a character string number "1", and the address of the character string C1 as a leading character string address are established.

Control then returns to step S10.

As described above, the character strings are classified into logical rows, as shown in FIG. 4, generating the logical row table T2.

Figure 7:
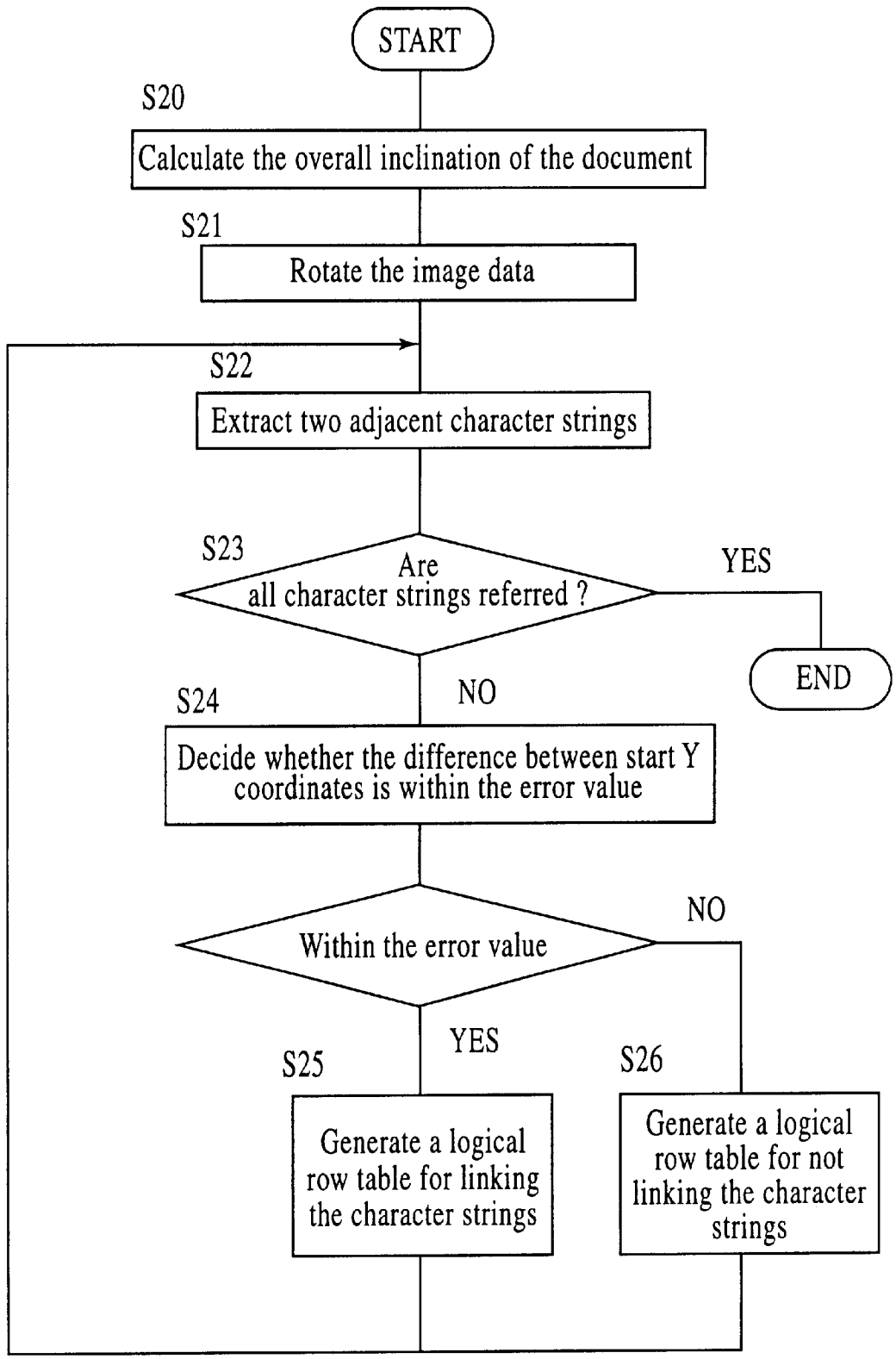
FIG. 7 is a flowchart of another logical row extracting process.

FIG. 7 shows another logical row extracting process. In FIG. 7, numbers with a prefix "S" represent steps of the logical row extracting process.

(S20) The CPU 4 calculates the overall inclination of the document from the image data of the document. For example, the CPU 4 determines a circumscribed rectangle of the document from the image data, and calculates the inclination of the circumscribed rectangle.

(S21) The CPU 4 rotates the image data of the document to correct the determined inclination. Then, the CPU 4 carries out the above character string extracting process.

(S22) The CPU 4 extracts two adjacent character strings from the character string table T1.

(S23) The CPU 4 decides whether all character strings in the character string table T1 have been referred to. If all character strings in the character string table T1 have been referred to, then control comes to an end.

(S24) If not all character strings in the character string table T1 have been referred to, then the CPU 4 calculates the difference Y between start Y coordinates of two character strings that are compared, and decides whether the difference Y is smaller than an error range or not. If the difference Y is equal or smaller than the error range, then the CPU 4 judges the character strings as belonging to the same logical row, and control proceeds to step 25. If the difference Y is greater than the error range, then the CPU 4 judges the character strings as not belonging to the same logical row, and control proceeds to step 26.

(S25) If two character strings are determined as belonging to the same logical row, then a logical row table for linking the character strings is generated. Control then returns to step S22.

(S26) If two character strings are determined as not belonging to the same logical row, then a logical row table for not linking the character strings is generated. Control then returns to step S22.

In this manner, the overall inclination of the document is detected, and thereafter corrected. Subsequently, logical rows are extracted.

Figure 8:
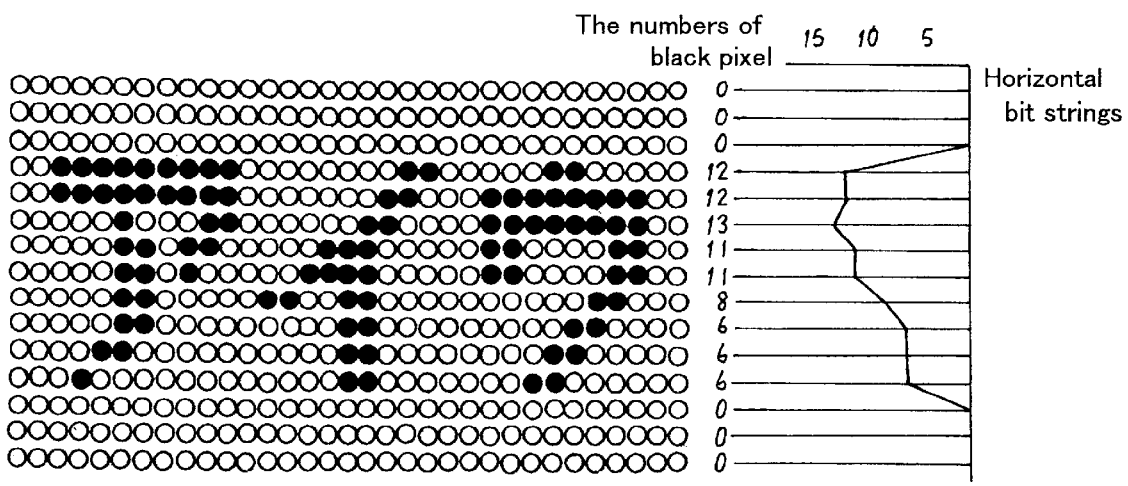
FIG. 8 is a diagram illustrating still another logical row extracting process.

FIG. 8 illustrates still another logical row extracting process.

As shown in FIG. 8, the bit map of image data is horizontally projected, and black pixels are counted in each of horizontal bit strings. The numbers of black pixels of the horizontally projected bit strings represent peaks where there are character strings as indicated by a graph shown in the right-hand side of FIG. 8.

It is determined that a logical row is present at the position (Y coordinate) where there is a bit string peak. A character string having the position (Y coordinate) where there is a logical row is extracted as a character string which belongs to one logical row. In this manner, it is possible to extract a character string belonging to a logical row.

A table structural part extracting process in step S3 shown in FIG. 2 will be described below with reference to FIGS. 10 through 14.

Figure 11:
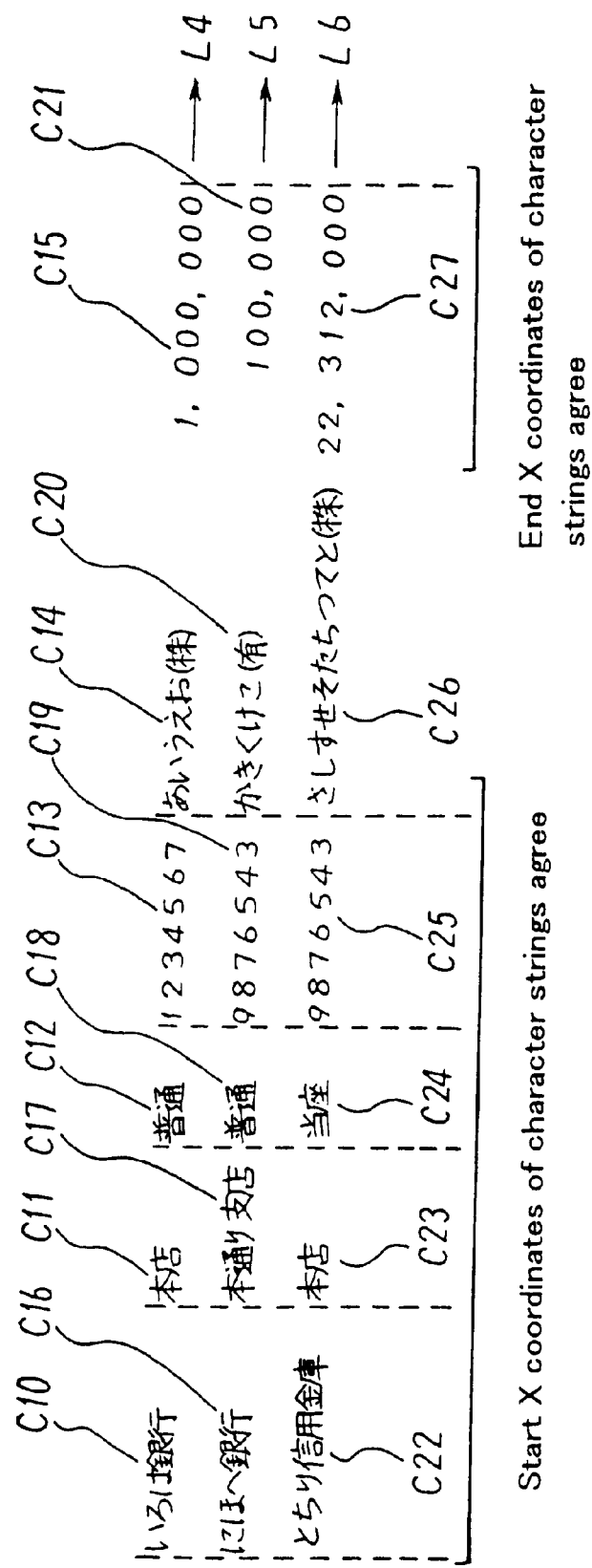
FIG. 11 is a diagram illustrating the table structural part extracting process shown in FIG. 10.

The table structural part extracting process decides whether vertically adjacent logic rows have the same row structure, i.e., have the same character string arrangement, or not. As shown in FIG. 11, character strings of vertically adjacent logic rows are referred to successively rightward from the leftmost ones. The CPU 4 decides whether start X coordinates or end X coordinates of the character strings agree with each other or not, i.e., whether the difference between the start X coordinates or end X coordinates of the character strings falls in an error range or not. If the start X coordinates or end X coordinates of all the character strings of the two logical rows agree with each other, then the CPU 4 judges that the character strings have the same row structure. The CPU 4 groups the logical rows having the same row structure into a block.

In FIG. 11, between two vertically adjacent rows L4 and L5, start X coordinates of the character strings C10, C11, C12, C13, C14 of the logical row L4 agree with start X coordinates of the character strings C16, C17, C18, C19, C20 of the logical row L5, and an end X coordinate of the character string C15 of the logical row L4 agrees with an end X coordinate of the character string C21 of the logical row L5. Therefore, since the logical rows L4, L5 have the same row structure, i.e., the same character string arrangement, the logical rows L4, L5 are classified into one block.

Similarly, because the logical row L6 and the logical row L5 have the same row structure, they are classified into one block. In the document shown in FIG. 31, therefore, the logical rows L4, L5, L6 are classified into a block B4. The other logical rows belong to respective blocks.

The table structural part extracting process will be described below with reference to FIG. 12. In FIG. 12, numbers with a prefix "S" represent steps of the table structural part extracting process.

(S30) The CPU 4 extracts two vertically adjacent logical rows from the logical row table T2.

(S31) The CPU 4 decides whether all logical rows in the logical row table T2 have been referred to. If all logical rows have been referred to, then control comes to an end.

(S32) If not all logical rows have been referred to, then the CPU 4 extracts character strings of two logical rows successively from the leftmost ones. The CPU 4 then decides whether start X coordinates or end X coordinates of two character strings of the logical rows agree with each other, and decide whether all character strings of the two logical rows agree with each other or not.

(S33) If all character strings of the two logical rows agree with each other, then a block table T3 (see FIG. 13) linking the two logical rows is generated. Then, control goes back to step S30.

As shown in FIG. 13, the block table T3 comprise block numbers, start coordinates, end coordinates, character string numbers, logical row numbers, logical column numbers, leading logical row addresses, leading logical column addresses, and attributes.

In the example shown in FIG. 10, with respect to the block B4 having the block number 4, since the block B4 links three logical rows L4, L5, L6, the start coordinate is set to the leading coordinate of the three logical rows, and the end start coordinate is set to the trailing coordinate of the three logical rows. The character string number is set to "18", and the logical row number is set to "3". The leading logical row address is set to the address of the logical row 4.

(S34) If any character strings of the two logical rows do not agree with each other, a block table T3 not linking the two logical rows is generated. Then, control goes back to step S30.

In the example shown in FIG. 10, with respect to the block B3 having the block number 3, since the block B3 comprises the logical row L3 only, the start coordinate is set to the leading coordinate of the logical row L3, and the end coordinate is set to the trailing coordinate of the logical row L3. The character string number is set to "5" which is the character string number of the logical row L3, and the logical row number is set to "1". The leading logical row address is set to the address of the logical row 4.

In this fashion, the block table shown in FIG. 13 is generated with respect to the example shown in FIG. 10. A block which has the greatest logical row number, an upper block above the block, and a lower block beneath the block are extracted as a table structural part.

Figure 14:
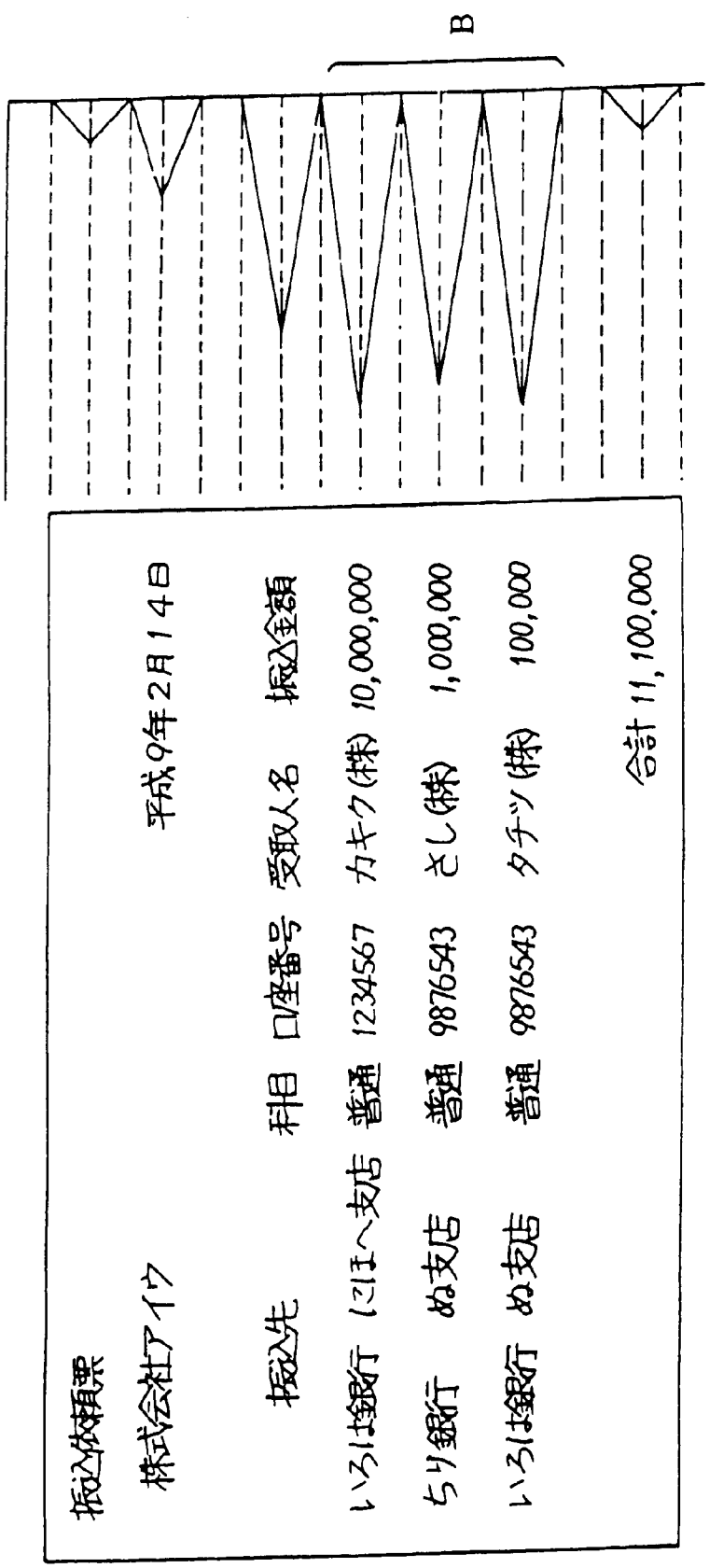
FIG. 14 is a view of a document, illustrating another table structural part extracting process.

FIG. 14 illustrates another table structural part extracting process.

As shown in FIG. 14, the bit map of image data is horizontally projected, and black pixels are counted in each of horizontal bit strings. The numbers of black pixels of the horizontally projected bit strings represent peaks where there are character strings as indicated by a graph shown in the right-hand side of FIG. 14.

An area which provides a table structure has logical rows spaced at equal intervals and arranged in a regular pattern. The area B where logical rows are spaced at equal intervals and have the same numbers of black pixels is judged as an area belonging to a table structure. In this manner, it is also possible to extract logical rows which belong to a table structure.

A logical column extracting process in step S4 shown in FIG. 2 will be described below with reference to FIGS. 15 through 18.

Figure 15:
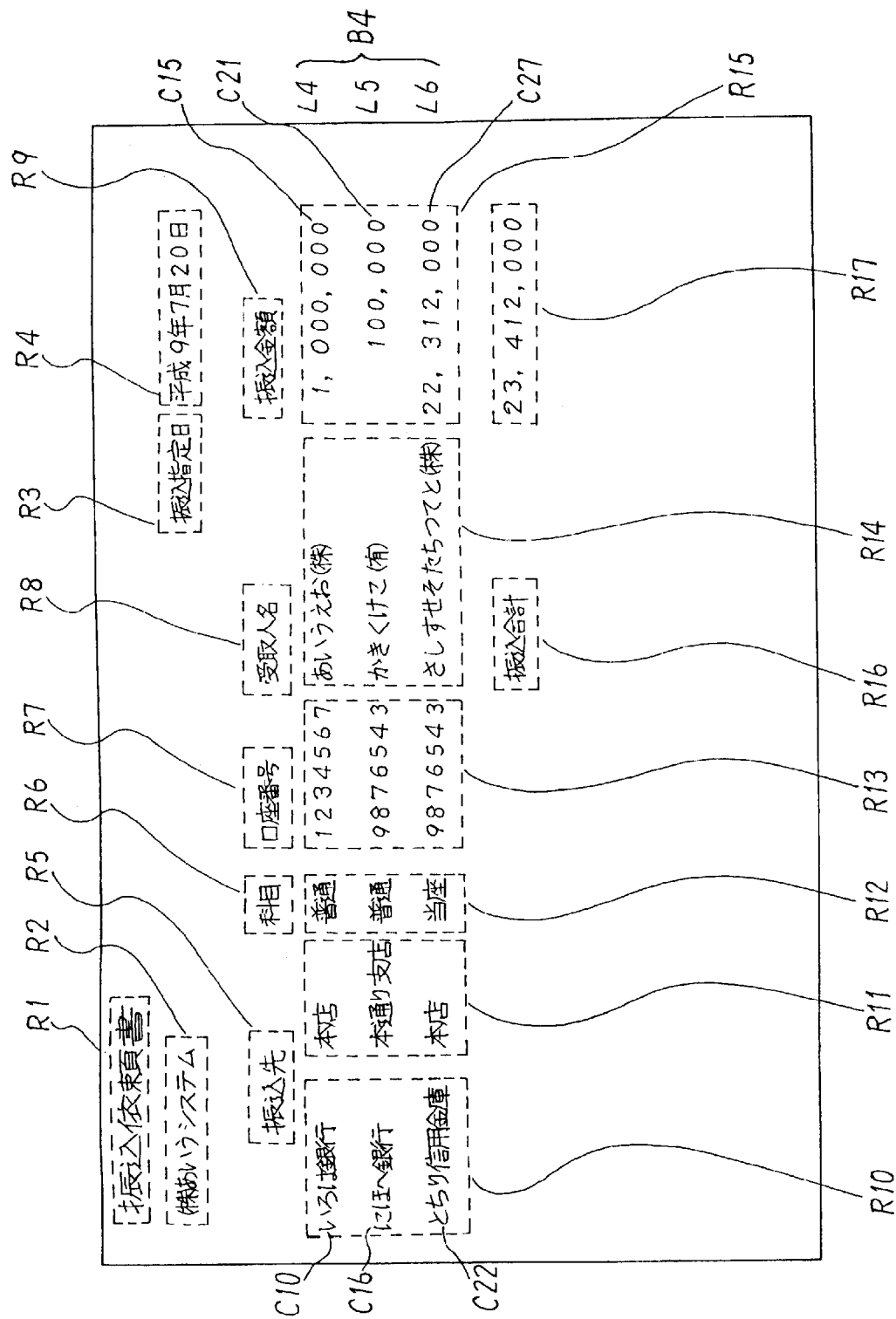
FIG. 15 is a view of a document, illustrating a logical column extracting process in the processing sequence shown in FIG. 2.

The logical column extracting process classifies character strings into logical columns in each block, i.e., classifies character strings having the same structure into the same logical column in each block. As shown in FIG. 15, the CPU 4 decides whether character strings of vertically adjacent blocks have the same structure or not. Specifically, character strings of vertically adjacent blocks are referred to successively rightward from the leftmost ones. The CPU 4 decides whether start X coordinates or end X coordinates of the character strings agree with each other, i.e., whether the difference between the start X coordinates or end X coordinates of the character strings falls in an error range or not. If the start X coordinates or end X coordinates of the character strings agree with each other, then the CPU 4 judges that the character strings have the same column structure. The CPU 4 groups the character strings having the same column structure into a logical column.

In FIG. 15, in the block B4, start X coordinates of the character strings C10, C11, C12, C13, C14 of the logical row L4 agree with start X coordinates of the character strings C16, C17, C18, C19, C20 of the logical row L5, and an end X coordinate of the character string C15 of the logical row L4 agrees with an end X coordinate of the character string C21 of the logical row L5.

Similarly, start X coordinates of the character strings C16, C17, C18, C19, C20 of the logical row L5 agree with start X coordinates of the character strings C22, C23, C24, C25, C26 of the logical row L6, and an end X coordinate of the character string C21 of the logical row L5 agrees with an end X coordinate of the character string C27 of the logical row L6.

Therefore, the character strings C10–C27 of the block B4 are classified into six logical columns R10–R15.

Figure 16:
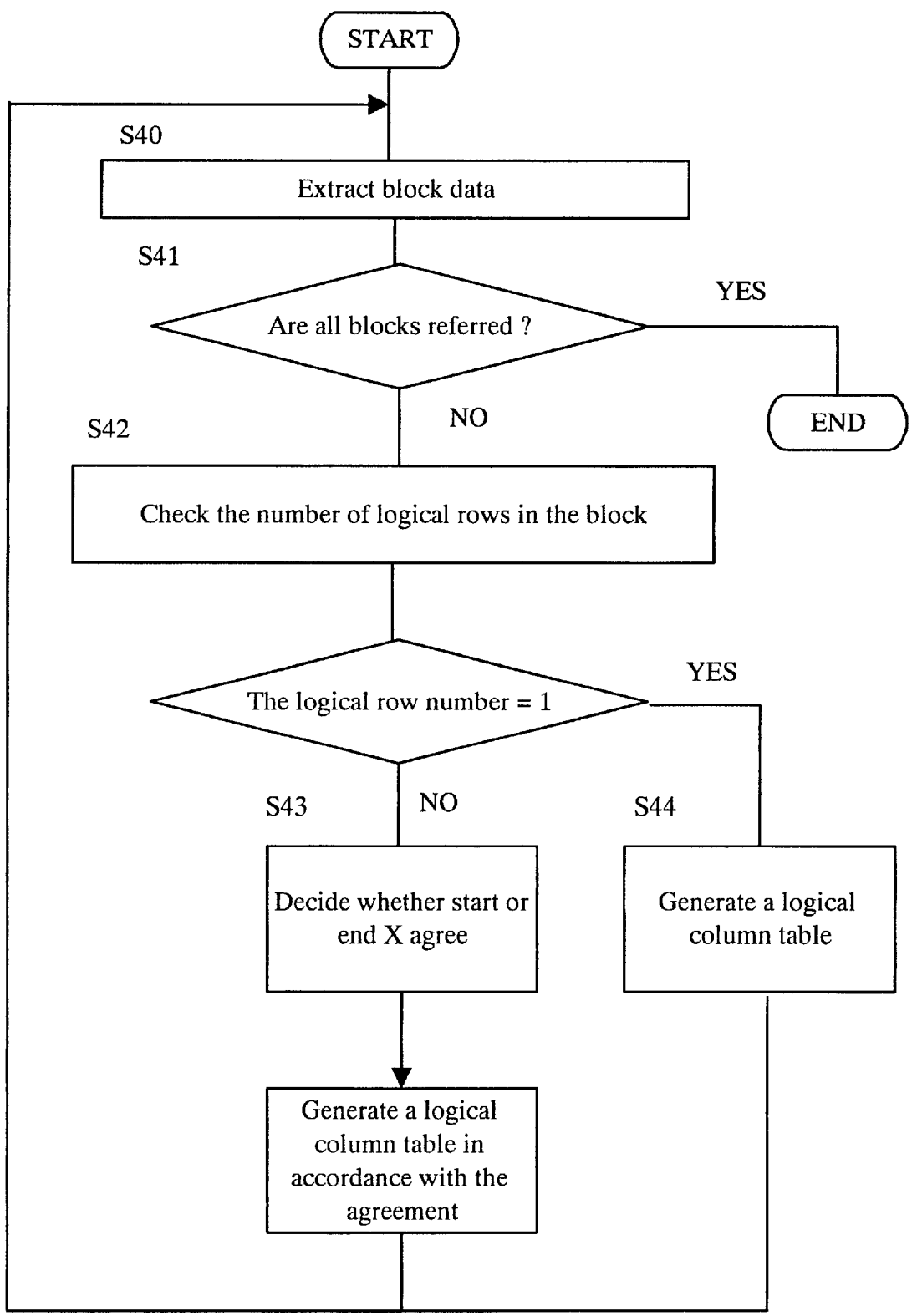
FIG. 16 is a flowchart of the logical column extracting process shown in FIG. 15.

The logical column extracting process will be described below with reference to FIG. 16. In FIG. 16, numbers with a prefix "S" represent steps of the logical column extracting process.

(S40) The CPU 4 extract information of the blocks from the block table T3.

(S41) The CPU 4 decides whether all blocks in the block table T3 have been referred to. If all blocks have been referred to, then control comes to an end.

(S42) If not all blocks in the block table T3 have been referred to, then the CPU 4 decides whether the logical row number of an extracted block is "1" or not.

(S43) If the logical row number of an extracted block is not "1", then the CPU 4 decides whether start X coordinates or end X coordinates of the character strings of the extracted block agree with each other or not. If they agree with each other, then the CPU 4 generates a logic column table T4 (see FIG. 17) according to the agreed coordinates. Then control goes back to step S40.

As shown in FIG. 17, the logic column table T4 comprises logic column numbers, start coordinates, end coordinates, character string numbers, and leading character string addresses.

In the example shown in FIG. 15, there are established 17 logical columns R1–R17 as a whole. With respect to the logical column R10 belonging to the block B4, since the three character strings C10, C16, C22 are grouped into the logical column R10, a start coordinate is set to the leading coordinate of the three character strings, and an end coordinate is set to the trailing coordinate of the three character strings. The character string number is set to "3", and the leading character string address is set to the address of the character string C10. As shown in FIG. 18, the address of the character string C16 is set to the logical column link destination of the character string C10 in the character string table T1. Similar settings are established for the logical column R11.

(S44) if the logical row number of an extracted block is "1", then the CPU 4 generates a logical column table T4 of one character string. Then, control goes back to step S40.

In the example shown in FIG. 15, with respect to the logical column R3 having the logical column number 3, since the logical column R3 comprises the character string C3 only, a start coordinate is set to the leading coordinate of the character string C3, and an end coordinate is set to the trailing coordinate of the character string C3. The leading character string address is set to the address of the character string C3.

In this manner, the logical column table T4 shown in FIG. 17 is generated with respect to the example shown in FIG. 15.

A block combining process and an attribute allocating process in step S5 shown in FIG. 2 will be described below with reference to FIGS. 19 through 24.

The block combining process is effected to establish a link between logical columns. The block combining process decides whether the block having the greatest logical row number and the upper block above the block in an area extracted as a table structural part have the same logical column structure or not. If the blocks have the same logical column structure, then logical columns are regenerated such that the blocks will be combined into one logical column structure.

Figure 19:
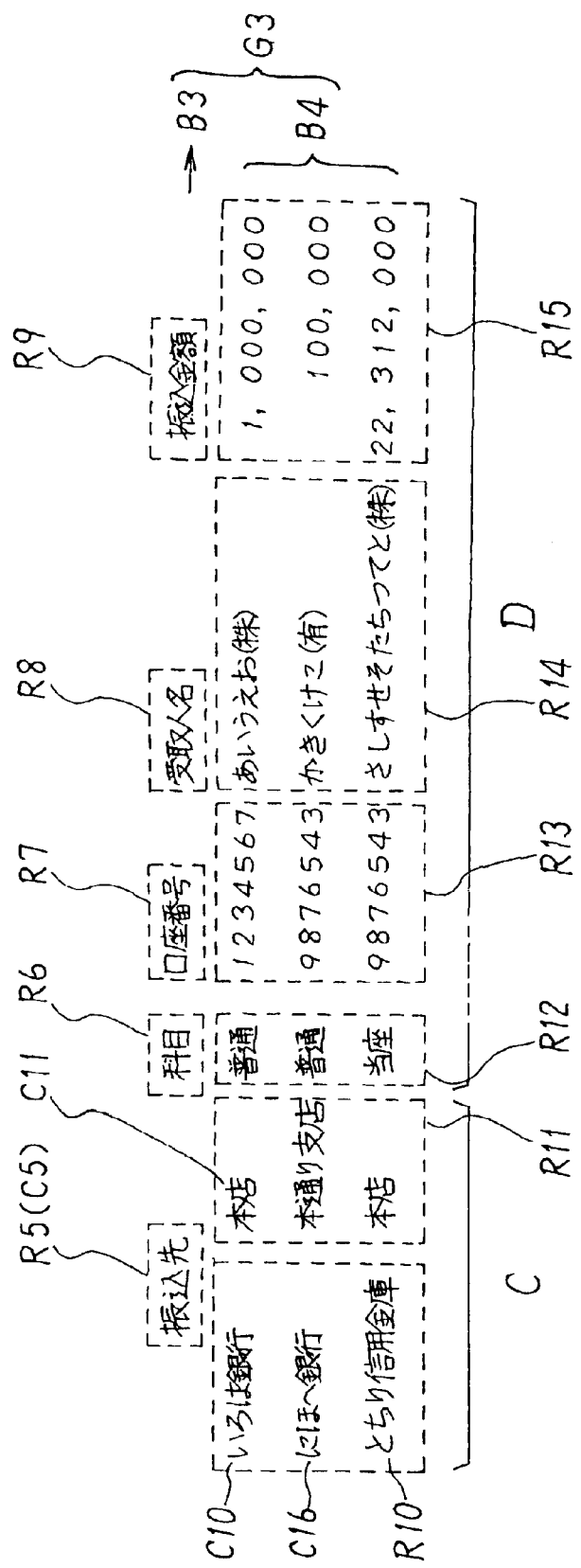
FIG. 19 is a diagram illustrating a block combining process in the processing sequence shown in FIG. 2.

As shown in FIG. 19, the CPU 4 decides whether the block B4 having the greatest logical row number and the upper block B3 above the block B4 have the same logical column structure or not. In an area D shown in FIG. 19, four logical columns R12–R15 of the block B4 and four logical columns R6–R9 of the block B3 have the same X coordinates. Therefore, the blocks B3, B4 in the area D are judged as having the same logical column structure. In an area C shown in FIG. 19, the block B3 has one logical column R5, and the block B4 has two logical columns R10, R11. Therefore, the blocks B3, B4 in the area C have different logical column structures.

However, since the block structures in the area D have the same logical column structure, the blocks B3, B4 are judged as having the same logical column structure, and the logical columns in the block B3 and the logical columns in the block B4 are combined with each other. Specifically, the logical columns R10, R11 are combined with the logical column R5, the logical column R12 with the logical column R6, the logical column R13 with the logical column R7, the logical column R14 with the logical column R8, and the logical column R15 with the logical column R9. In this manner, a link between the logical columns of the blocks B3, B4 is established.

As shown in FIG. 22, the logical column table T4 is updated according to the above combination of the logical columns. For example, the end coordinate of the logical column R5 (having the logical column number 5) is updated into the end coordinate of the logical column R11, and the character string number of the logical column R5 is updated into "7" so as to include the character strings of the logical columns R10, R11. Because the logical columns R10, R11 are combined with each other, the character string numbers of the logical columns R10, R11 are updated into "0".

A link between the character strings is established according to the combination of the logical columns. In a character string table T1 shown in FIG. 21, the logical column link destination address of the character string C5 is set to the address of the character string C10.

Figure 20:
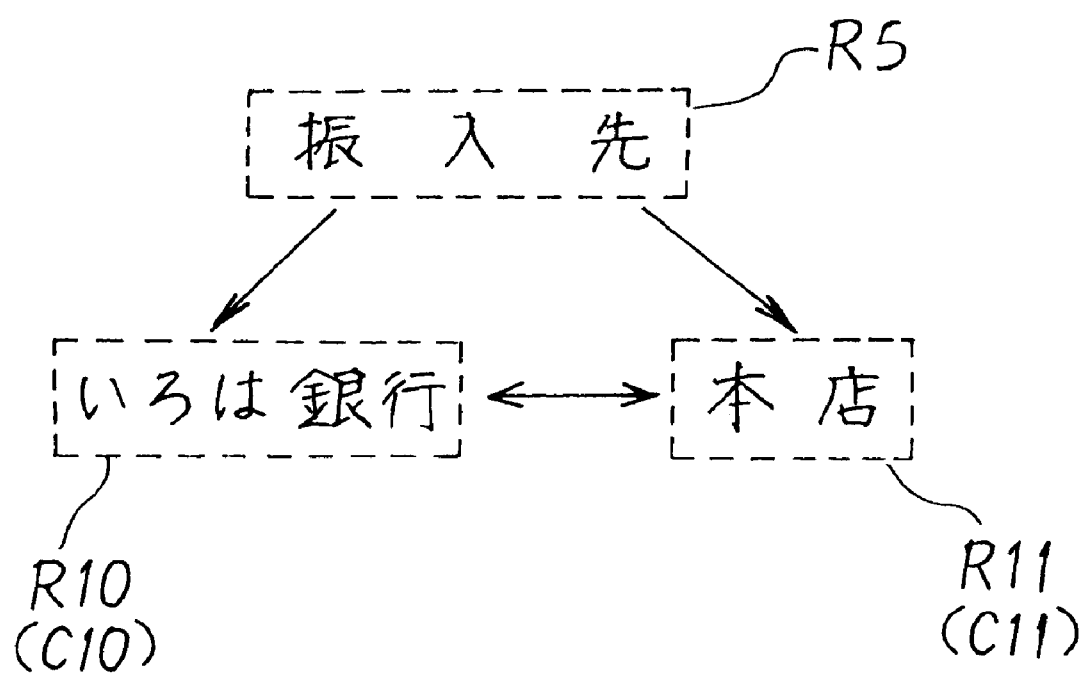
FIG. 20 is a diagram illustrating a nesting process in the processing sequence shown in FIG. 2.

Nest information is established in order to define data of one meaning for a plurality of character strings. In the example shown in FIG. 19, the character string C5 has a meaning with respect to the character string C10 and the character string C11, as shown in FIG. 20. Therefore, nest information is established between the two character strings C10, C11, indicating that the two character strings C10, C11 belong to one column.

In FIG. 21, inasmuch as the character strings C10, C11 are regarded as belonging to one column, a nest flag (ON) is established with respect to each of the character strings C10, C11, and branch numbers are assigned respectively to the character strings C10, C11, indicating that the character strings C10, C11 are paired. In order to make the character strings C10, C11 belong to one column, the logical column link destination address of the character string C10 is set to the address of the character string C11. Similarly, the logical column link destination address of the character string C11 is set to the address of the character string C16.

Then, attributes are allocated to the blocks of an extracted table structural part. Specifically, a body block attribute is allocated to the block which has the greatest number of logical rows on the document. A header block attribute is allocated to the block positioned above the body block. A footer block attribute is allocated to the block positioned beneath the body block.

Figure 23:
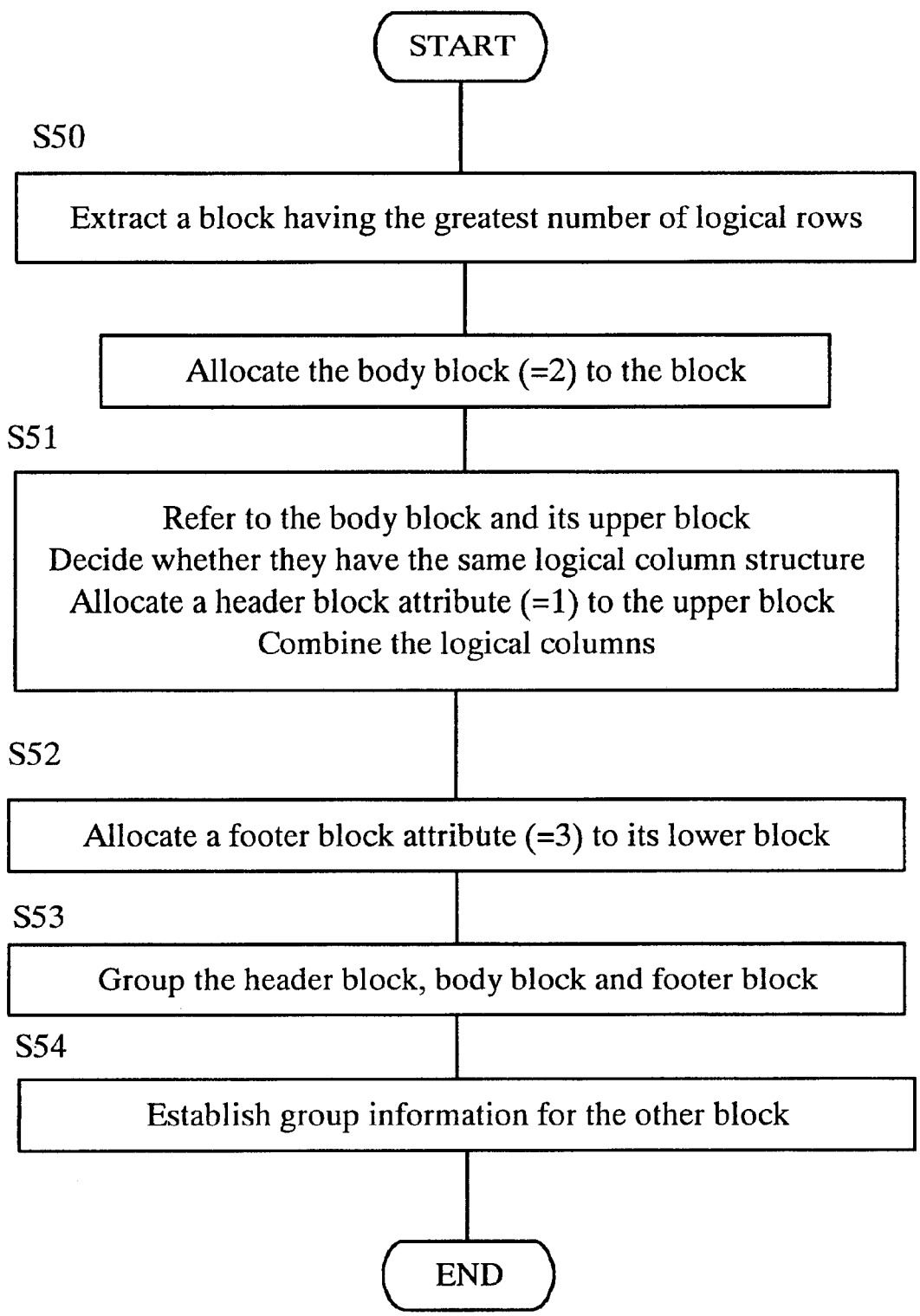
FIG. 23 is a flowchart of the block combining process and an attribute allocating process in the processing sequence shown in FIG. 2.

The attribute allocating process will be described below with reference to FIG. 23. In FIG. 23, numbers with a prefix "S" represent steps of the attribute allocating process.

(S50) The CPU 4 refers to the block table T3 to extract a block having the greatest number of logical rows, and allocates a body block attribute (=2) to the extracted block. In FIG. 13, the body block attribute (=2) is allocated to the block B4.

(S51) As described above with reference to FIG. 19, the CPU 4 refers to the body block and an upper block above the body block to decide whether they have the same logical column structure or not. If they have the same logical column structure, the CPU 4 allocates a header block attribute (=1) to the upper block. In FIG. 13, the header block attribute (=1) is allocated to the block B3. Then, the CPU 4 combines the logical columns of these blocks.

(S52) The CPU 4 allocates a footer block attribute (=3) to a lower block which is positioned beneath the body block. In FIG. 13, the footer block attribute (=3) is allocated to the block B5.

Figure 24:
FIG. 24 is a diagram showing a group table used in the attribute allocating process shown in FIG. 23.

(S53) The CPU 4 groups the header block, the body block, and the footer block, and generates a group table T5 as shown in FIG. 24. The group table T5 comprises group numbers, start coordinates, end coordinates, block numbers, and leading block addresses. As shown in FIG. 24, for the group number "3", the block number is set to "3", and the leading block address is set to the address of the block 3.

(S54) The CPU 4 establishes group information for the other blocks. As shown in FIG. 24, in the example shown in FIG. 13, for the group number "1", the block number is set to "1", and the leading block address is set to the address of the block 1. For the group number "2", the block number is set to "1", and the leading block address is set to the address of the block 2. Thereafter, control comes to an end.

In this manner, the logical columns of blocks are combined with each other, and attributes are allocated to the blocks.

A header extracting process in step S6 shown in FIG. 2 will be described below with reference to FIGS. 25 and 26.

The header extracting process extracts an area which is possibly a header for character strings. A header is extracted using block attributes established as described above, according to the following rules:

(A) A header block is possibly a header.

(B) A footer block, except for a character string at the rightmost position, is possibly a header.

(C) All other blocks, exclusive of body blocks, are possibly a header.

Figure 25:
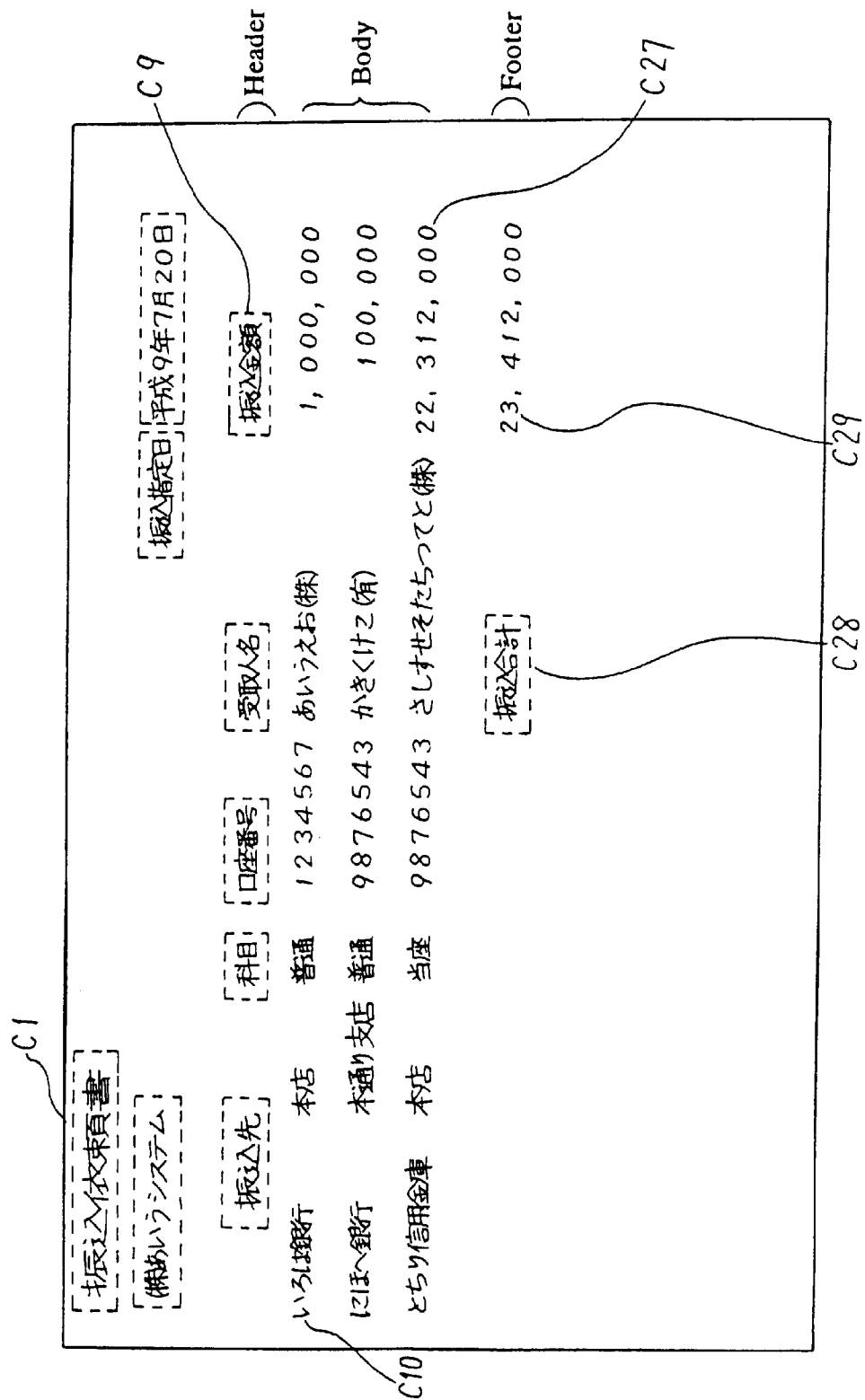
FIG. 25 is a view of a document, illustrating a header extracting process in the processing sequence shown in FIG. 2.

As shown in FIG. 25, the character strings C1–C9, C28 which are enclosed by dotted lines on the document shown in FIG. 31 are extracted as areas which are possibly headers. In a character string table T1 shown in FIG. 26, a header flag is set to "1" for the character strings C1–C9, C28 which are possibly headers.

In this manner, character strings are divided into headers and data.

Figure 27:
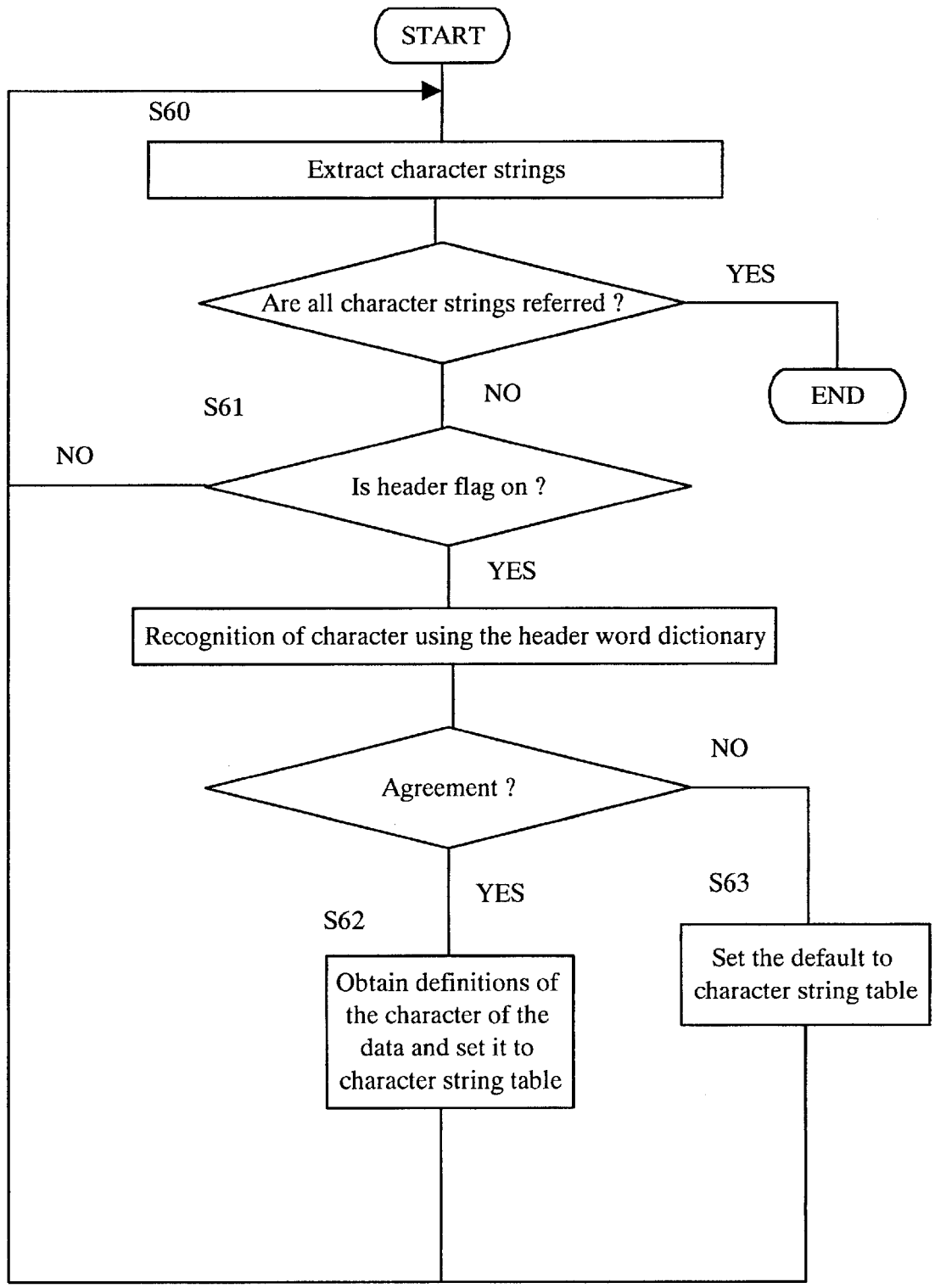
FIG. 27 is a flowchart of a header recognizing process in the processing sequence shown in FIG. 2.

A header recognizing process in step S7 shown in FIG. 2 will be described below with reference to FIGS. 27–29. In FIG. 27, numbers with a prefix "S" represent steps of the header recognizing process.

(S60) The CPU 4 extracts character strings from the character string table T1.

(S61) If not all character strings have been referred to, then the CPU 4 checks if the header flag of a character string is on ("1") or not. If the header flag is not on, control returns to step S60. If the header flag is on, then the CPU 4 recognizes characters of the character string using the header word dictionary 50 (50-1). As shown in FIG. 28, the header word dictionary 50-1 contains image data of predetermines words and header identification codes thereof. For example, the header word dictionary 50-1 contains the image data of Kanji characters of a transfer destination with respect to a header identification code "transfer destination". The CPU 4 compares with image data of the character string of a header with the header word dictionary 50-1 to recognize the header.

(S62) If the CPU 4 finds the same header in the header word dictionary 50-1, then the CPU 4 obtains the header identification code of the header, and obtains definitions (category and font name) of the characters of the data using a header identification table 50-2 shown in FIG. 28. The header identification table 50-2 contains character recognition categories and character fonts corresponding to header identification codes. From the header identification table 50-2, there are available header identification codes (function names), character recognition categories (Kanji characters, numerical characters, and alphabetical characters), and character font names (type and hand-written characters).

A character string of the data corresponding to the header can be identified from the logical column link destination address of the character string of the header which is registered in the character string table T1. As shown in FIG. 29, the CPU 4 establishes a function name, a character recognition category, and a font, which have been identified, in the column of function names, the column of character recognition categories, and the column of font names with respect to the character string number indicated by the logical column link destination address. Then, control returns to step S60.

(S63) A character string which is free of a header pattern determined as a header and corresponding to an entry of the header word dictionary 50-1 represents data. Therefore, the CPU 4 establishes a predetermined character recognition category and font in the character string table T1. Then control returns to step S60.

In FIG. 29, since the logical column link destination of the header character string C5 is the character string C10, the recognized function name, character recognition category, and font of the header character string C5 are established with respect to the character string C10. While the character string C2 has been judged as a header, it is determined as data because there is no corresponding header pattern in the header word dictionary 50-1. For the character string C2, a predetermined character recognition category (Kanji) and font (type) are established in the character string table T1.

In this manner, a header is recognized using the header word dictionary, and a character attribute of the corresponding data is obtained.

FIG. 30 shows a data recognizing process in step S8 shown in FIG. 2. In FIG. 30, numbers with a prefix "S" represent steps of the data recognizing process.

(S70) The CPU 4 extracts a character string from the character string table T1. The CPU 4 decides whether all character strings in the character string table T1 have been referred to. If all character strings in the character string table T1 have been referred to, then control comes to an end.

(S71) If not all character strings in the character string table T1 have been referred to, then the CPU 4 checks if the header flag of a character string is on ("1") or not. Since the header flag of a header is on, if the header flag is on, the character string does not represent data. Therefore, if the header flag is on, control goes back to step S70.

(S72) If the header flag is not on, then the character string represents data. Accordingly, the CPU 4 extracts the character recognition category and font of the character string from the character string table T1. Based on the extracted character recognition category and font, the CPU 4 selects one of the dictionaries 5*l*–5*n* which is different for each category and font (see FIG. 1), and recognizes the characters of the character string by using selected dictionary. Thereafter, control goes back to step S70.

Characters of data can thus be recognized according to the character recognition process which is optimum for the recognized content of a header. As a result, it is possible to recognize characters with high accuracy. Since headers and data are automatically distinguished from each other based on the arrangement of character strings, attributes of data can automatically be recognized.

In the above illustrated embodiments, headers and data are distinguished from each other based on the positional relationship between characters for each document. However, distinguished results may be registered, and characters of data on documents may subsequently be recognized using the registered distinguished results.

The present invention offers the following advantages:

(1) Because headers and data on documents are automatically distinguished from each other to recognize header characters, character attributes of the data can automatically be determined.

(2) Since headers are universal in nature and characters used therefor are limited, the header characters can easily be recognized.

(3) Furthermore, inasmuch as characters of data are recognized depending on the character attribute that has been determined, the characters of data are recognized with increased accuracy.

Although certain preferred embodiments of the present invention have been shown and described in detail, it should be understood that various changes and modifications may be made therein without departing from the scope of the appended claims.

What is claimed is:

1. A method of recognizing characters of headers and characters of data on a document, comprising the steps of:

extracting character strings having the characters of the headers of the data and the characters of the data on the document by an image data of the document;

distinguishing between the headers of the data and the data on the document by detecting each position of said extracted character strings, categorizing said extracted character strings into rows and columns according to said detected position of said extracted character strings, categorizing said extracted character strings into associated blocks according to said categorized rows and columns, detecting positions of each of said blocks, and determining the header from the detected positional relationship between said blocks;

determining character attributes of the data by recognizing characters of the character strings of the headers using a header recognition dictionary for storing a relationship between said headers and an attribute of said headers; and recognizing characters of the character strings of the data according to the determined character attributes of the data.

2. The method according to claim 1, wherein said step of determining character attributes of the data comprises the step of:

determining the positions, character kinds, and font names of character strings of the data.

3. The method according to claim 2, wherein said step of determining character attributes of the data comprises the step of:

determining data names of character strings of the data.

4. A method of recognizing characters of headers and characters of data on a document, comprising the steps of:

extracting character strings on the document by reading the document;

distinguishing between headers and data on the document by determining the positional relationship between the character strings;

determining character attributes of the data by recognizing characters of the character strings of the headers using a header recognition dictionary; and recognizing characters of the character strings of the data according to the determined character attributes of the data, wherein said step of distinguishing between headers and data comprises the steps of:

extracting character strings belonging to one logical row from the positional relationship between the character strings;

extracting logical rows which have the same arrangement of character strings, as a block;

extracting character strings which have the same structure as a logical column in each of blocks;

determining an associated relationship between logical columns from the positional relationship between the logical columns; and determining headers of the logical columns from the positional relationship between the blocks.

5. The method according to claim 4, wherein said step of extracting logical rows comprises the step of:

extracting logical rows in which character strings have the same arrangement; and wherein said step of determining headers comprises the step of:

determining a block having a maximum logical row number as data, and blocks positioned above and beneath the determined block as headers.

6. The method according to claim 4, wherein said step of extracting character strings belonging to one logical row comprises the step of:

deciding whether two character strings are positioned in one logical row from the positional relationship between the two character strings.

7. The method according to claim 4, wherein said step of extracting logical rows comprises the step of:

deciding whether two logical rows have the same row structure from the positional relationship between upper and lower logical lows, and grouping the logical rows which have the same row structure into a block.

8. The method according to claim 4, wherein said step of extracting character strings which have the same structure comprises the step of:

deciding whether character strings of the logical column in each of blocks are positioned as upper and lower character strings, and grouping the character strings positioned as upper and lower character strings into one logical column.

9. The method according to claim 8, wherein said step of extracting character strings which have the same structure comprises the step of:

deciding whether a block having a maximum logical row number and a block having a logical row positioned above the block having the maximum logical row number have the same column structure, and grouping the blocks having the same column structure into a logical column.

10. The method according to claim 4, wherein said step of determining an associated relationship between logical columns comprises the step of:

deciding whether the logical columns are positioned as upper and lower columns to determine the associated relationship therebetween.

11. A recognition method of a layout of a document comprising:

a procedure of extracting character strings having the characters of the headers of the data and the characters of the data on the document from an image of the document;

a procedure of distinguishing between the headers of data and the data on the document by detecting each position of said extracted character strings, categorizing said extracted character strings into rows and columns according to said detected position of said extracted character strings, categorizing said extracted character strings into associated blocks according to said categorized rows and columns, detecting positions of each of said blocks, and determining the header from the detected positional relationship between said blocks; and a procedure of determining the layout from said distinguished headers of data and the data on the document.

12. A recognition system of a layout of a document comprising:

an input means for inputting an image of the document; and a recognition means for extracting character strings having the characters of the headers of the data and the characters of the data on the document from said inputted image of the document, distinguishing between the headers of data and the data on the document by detecting each position of said extracted character strings, categorizing said extracted character strings into rows and columns according to said detected position of said extracted character strings, categorizing said extracted character strings into associated blocks according to said categorized rows and columns, detecting positions of each of said blocks, and determining the header from the detected positional relationship between said blocks, and determining the layout from said distinguished headers of data and the data on the document.

13. A storage medium storing a program for recognition of a layout of a document comprising:

a first program for extracting character strings having the characters of the headers of the data and the characters of the data on the document from an image of the document;

a second program for distinguishing between the headers of data and the data on the document by detecting each position of said extracted character strings, categorizing said extracted character strings into rows and columns according to said detected position of said extracted character strings, categorizing said extracted character strings into associated blocks according to said categorized rows and columns, detecting positions of each of said blocks, and determining the header from the detected positional relationship between said blocks; and a third program for determining the layout from said distinguished headers of the data and the data on the documment.

* * * * *